(12) United States Patent
Zhang et al.

(10) Patent No.: US 12,126,041 B1
(45) Date of Patent: Oct. 22, 2024

(54) MULTI-DENSITY MATERIAL FOR BATTERY SUBASSEMBLIES

(71) Applicant: Rivian IP Holdings, LLC, Irvine, CA (US)

(72) Inventors: Yichi Zhang, Irvine, CA (US); Liangliang Li, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/360,732

(22) Filed: Jul. 27, 2023

(51) Int. Cl.
*H01M 50/293* (2021.01)
*H01M 50/209* (2021.01)
*H01M 50/213* (2021.01)
*H01M 50/222* (2021.01)
*H01M 50/227* (2021.01)
*H01M 50/229* (2021.01)
*H01M 50/291* (2021.01)

(52) U.S. Cl.
CPC ....... *H01M 50/293* (2021.01); *H01M 50/209* (2021.01); *H01M 50/213* (2021.01); *H01M 50/222* (2021.01); *H01M 50/227* (2021.01); *H01M 50/229* (2021.01); *H01M 50/291* (2021.01); *H01M 2220/20* (2013.01)

(58) Field of Classification Search
CPC ............. H01M 50/293; H01M 50/209; H01M 50/213; H01M 50/222; H01M 50/227; H01M 50/229; H01M 50/291; H01M 2220/20
See application file for complete search history.

(56) References Cited

U.S. PATENT DOCUMENTS

2019/0123315 A1* 4/2019 Narbonne ........... H01M 50/213
2022/0393266 A1* 12/2022 Jang ..................... H01M 50/211

* cited by examiner

*Primary Examiner* — Ula C Ruddock
*Assistant Examiner* — Sarika Gupta
(74) *Attorney, Agent, or Firm* — BAKERHOSTETLER

(57) ABSTRACT

An apparatus may include a material with different portions having different densities. In one or more implementations, the material includes beads. Despite the different densities, the material is the same for both densities, thus the material may include the same chemistry but with different densities. Based on using a material of the same chemistry, the beads may fuse together. The apparatus may take the form of a potting structure for battery cells. Alternatively, the apparatus may take the form of a battery subassembly for various battery applications.

18 Claims, 17 Drawing Sheets

MULTI-DENSITY MATERIAL FOR BATTERY SUBASSEMBLIES

INTRODUCTION

Batteries are often used as a source of power, including as a source of power for electric vehicles that include wheels that are driven by an electric motor that receives power from the batteries. Several battery cells may be carried within a module and/or a carrier.

SUMMARY

The subject technology is directed to battery subassemblies (e.g., battery modules, battery carriers, battery packing enclosures) and more particularly, to using a material with the same basic chemistry, but with portions of the material having different densities, to form a battery subassembly. In one or more implementations, the material takes the form of discrete components (e.g., beads) that fuse together based on the same chemistry, which may not require the use of adhesives or fasteners to hold the discrete components together. Aspects of the subject technology can help to reduce the weight and number of parts for batteries in electric vehicles, which can lead to longer vehicle driving ranges and mitigation of climate change by reducing greenhouse gas emissions.

In accordance with one or more aspects of the disclosure, an apparatus is described. The apparatus may include a first portion that includes a material having a density in a first density range. The apparatus may further include a second portion that includes the material having a density in a second density range different from the first density range. In one or more implementations, the first portion and the second portion define openings for battery cells.

The material at the first portion may be formed from a first set of beads of the first density range. The material at the second portion may be formed from a second set of beads of the second density range. A bead from the first set of beads may include a first dimension. A bead from the first set of beads may include a second dimension greater than the first dimension. The first density range may be greater than the second density range. The openings may include a first opening, a second opening, and a third opening. The first portion may form a pillar between the first opening, the second opening, and the third opening. The second portion may form a wall between the first opening and the second opening. The wall may connect to the pillar. The material may be selected from a group consisting of polyphenylene ether (PPE), modified polyphenylene ether (m-PPE), polyurethane, polystyrene, or polypropylene. The openings may include circular openings or rectangular openings. At a boundary between the first portion and the second portion, the first portion may include a first bead. At the boundary, the second portion may include a second bead fused with the first bead. The openings may include a circular opening having a diameter less than a battery cell diameter of a battery cell of the battery cells.

In accordance with one or more aspects of the disclosure, a battery subassembly is described. The battery subassembly may include a panel that includes several walls. The walls may include a material having a density in a first density range. The battery subassembly may further include one or more battery cell guides that extend from the panel. The one or more battery cell guides may include the material having a density in a second density range different from the first density range.

The panel may further include fibers. The fibers may be selected from a group that includes glass fibers, carbon fibers, or a combination thereof. The material at the several walls may be formed from a first set of beads of the first density range. The material at the one or more battery cell guides may be formed from a second set of beads of the second density range. The first set of beads may be separate from the second set of beads. The material may include a closed cell foam formed from the first set of beads and the second set of beads. Based on the material at least some of the first set of beads may be fused together. Based on the material, at least some of the second set of beads may be fused together. The panel may carry the battery pack within a vehicle. The first density range may be greater than the second density range.

The several walls may include a bottom wall. The several walls may further include one or more outer walls that define a perimeter of the panel. The one or more battery cell guides and the one or more outer walls may extend from the bottom wall.

In accordance with one or more aspects of the disclosure, a battery pack is described. The battery pack may include a battery module that includes battery cells. The battery pack may further include a battery subassembly configured to carry the battery module. The battery subassembly may include a panel that includes several walls that include a first material having a density in a first density range. The battery subassembly may further include one or more battery cell guides that extend from the panel. The one or more battery cell guides may include the first material having a density in a second density range different from the first density range. The battery pack may further include a potting structure configured to receive the battery cells. The potting structure may include a first portion that includes a second material having a density in a third density range. The potting structure may further include a second portion that includes the second material having a density in a fourth density range different from the third density range. In one or more implementations, the first portion and the second portion define openings for the battery cells.

The first density range may be greater than the second density range. The third density range may be greater than the fourth density range. The first density range may be defined by a first density and a second density. The first density may be less than 1.0 grams per cubic centimeter (g/cm$^3$). The second density may be greater than 1.0 g/cm$^3$.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1A:
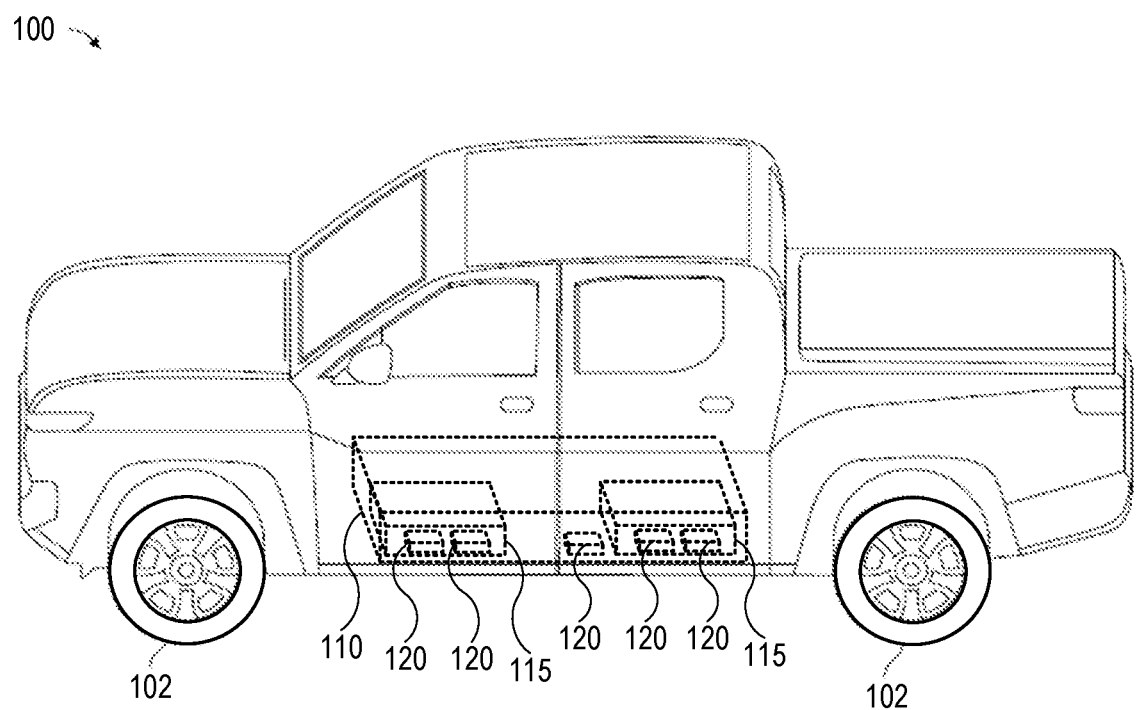
FIG. 1A and FIG. 1B illustrate schematic perspective side views of example implementations of a vehicle having a battery pack, in accordance with one or more implementations of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject technology described herein relate to an apparatus (e.g., potting structure, battery pack enclosure) that use a material with the same chemistry, but with the material having different densities at different locations of the apparatus. For example, the material in some portions of the apparatus may be within one density range, while the material in other portions may be in another, different density range. The phrase "same chemistry" may refer to a material with the same polymeric type defined according to the International Organization for Standardization (ISO) 1043, the same blend type, and/or the same material makeup. In one or more implementations, the material includes beads (e.g., foamed beads) of different density ranges. Based in part on using the same material, the beads may fuse (e.g., bond) together. In this regard, the apparatus may not require additional elements, such as adhesives or fasteners, to hold the material together. Beneficially, the apparatus may provide mechanical support with a reduced weight and fewer parts.

In one or more implementations, the apparatus takes the form of a potting structure for battery cells. The potting structure may include several pillars formed from beads having a relatively high density, as well as several walls formed from beads having a relatively low density. The high density pillars may include dense, compacted beads, and may provide structural rigidity and integrity, thus maintaining and supporting a stable position of the battery cells. Conversely, the walls may include beads with an uncompacted, loose bulk density, and may provide elasticity and flexibility to allow for expansion and contraction of the battery cells (e.g., during a heating and cooling phase of the battery cells). Further, the walls may provide protection against vibration (e.g., from a motor of a vehicle). In an exemplary process, a multi-step molding operation provides beads with the relatively high density to form the pillars, and provides beads with the relatively low density to form the walls. Alternatively, in one or more implementations, a high density (e.g., pre-molded) polymer is substituted for the high density beads, with the pre-molded polymer and the low density beads being formed from the material, thus the pre-molded polymer and the walls may include a material with the same chemistry.

In one or more implementations, the apparatus takes the form of a battery pack enclosure for battery cells. The battery pack enclosure may include a panel with several walls, including a bottom wall and several outer walls to form a perimeter. Additionally, the battery pack enclosure may include several internal walls and battery cell guides. The panel may be formed from beads having a relatively high density, while the internal walls and battery cells guides are formed from beads having a relatively low density. In this regard, the panel may provide structural rigidity and integrity, while the internal walls and battery cell guides may provide elasticity to allow for expansion and contraction of the battery cells, as well as protection against vibration. Moreover, the panel may further include fibers (e.g., carbon fiber, glass fiber) to provide additional structural support and rigidity. Similar to the potting structure, the battery pack enclosure may include a high density polymer, substituted for the high density beads, to form the panel, with the polymer and the low density beads being formed from the same material.

The material for an apparatus described herein may be selected from a variety of substances. For example, the material may include a modified polyphenylene ether (m-PPE). Alternatively, the material may include one of polyphenylene ether (PPE), polyurethane, polystyrene, or polypropylene, as non-limiting examples.

FIG. 1A illustrates an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle 100 using electric power from the battery pack 110. In one or more implementations, the vehicle 100 may also, or alternatively, include one or more chemically-powered engines, such as a gas-powered engine or a fuel cell powered motor. For example, in one or more implementations, the vehicle 100 may include a fully electric or partially electric (e.g., hybrid or plug-in hybrid) vehicle. In various implementations, the vehicle 100 may be a fully autonomous vehicle that can navigate roadways without a human operator or driver, a partially autonomous vehicle that can navigate some roadways without a human operator while navigating other roadways with the supervision of a human operator, an unmanned vehicle that can navigate roadways or other pathways without any human occupants, or a human operated (non-autonomous) vehicle configured for a human operator.

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without the battery modules 115 and with the battery cells 120 mounted directly in the battery pack 110 (e.g., in a cell-to-pack configuration) and/or in other battery units that are installed in the battery pack 110. The battery pack 110 may include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

Each of the battery cells 120 may be included a battery, a battery unit, a battery module and/or a battery pack to power components of the vehicle 100. For example, a battery cell housing of the battery cells 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle). The power stage circuit can be provided as part of the battery pack 110 or separately from the battery pack 110 within the vehicle 100.

Figure 1B:
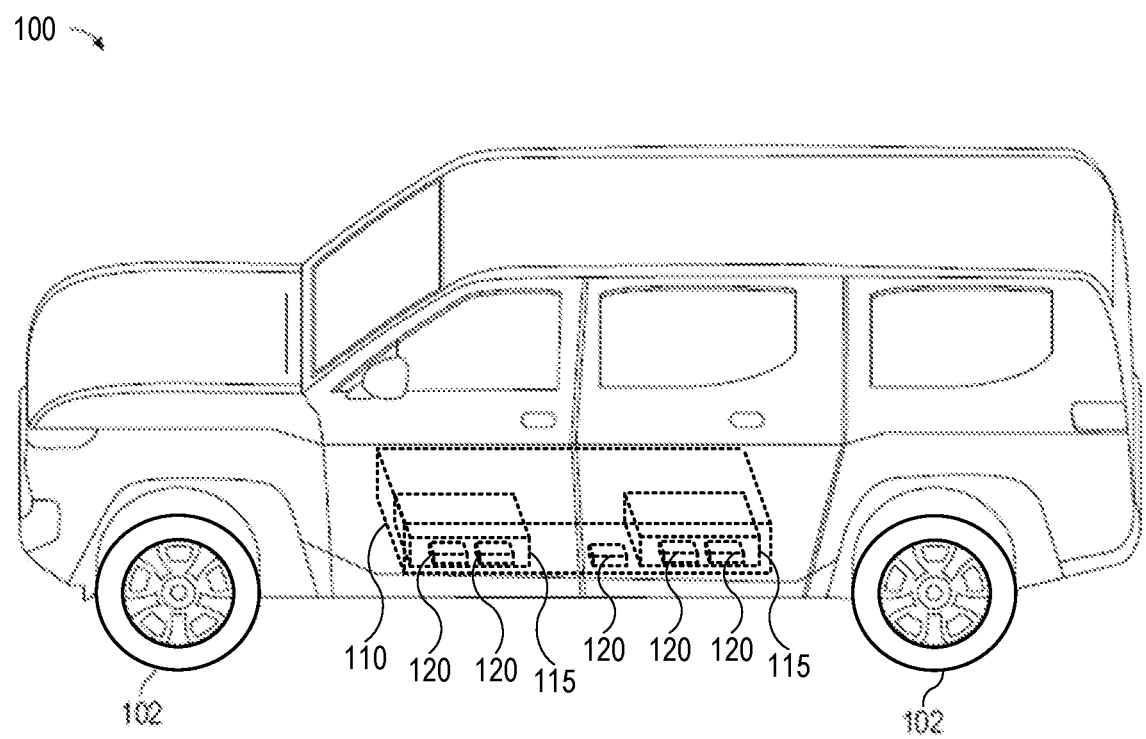

FIG. 1B illustrates another implementation in which the vehicle 100 is implemented as a sport utility vehicle (SUV), such as an electric sport utility vehicle. In the example of FIG. 1B, the vehicle 100 may include a cargo storage area that is enclosed within the vehicle 100 (e.g., behind a row of seats within a cabin of the vehicle 100). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
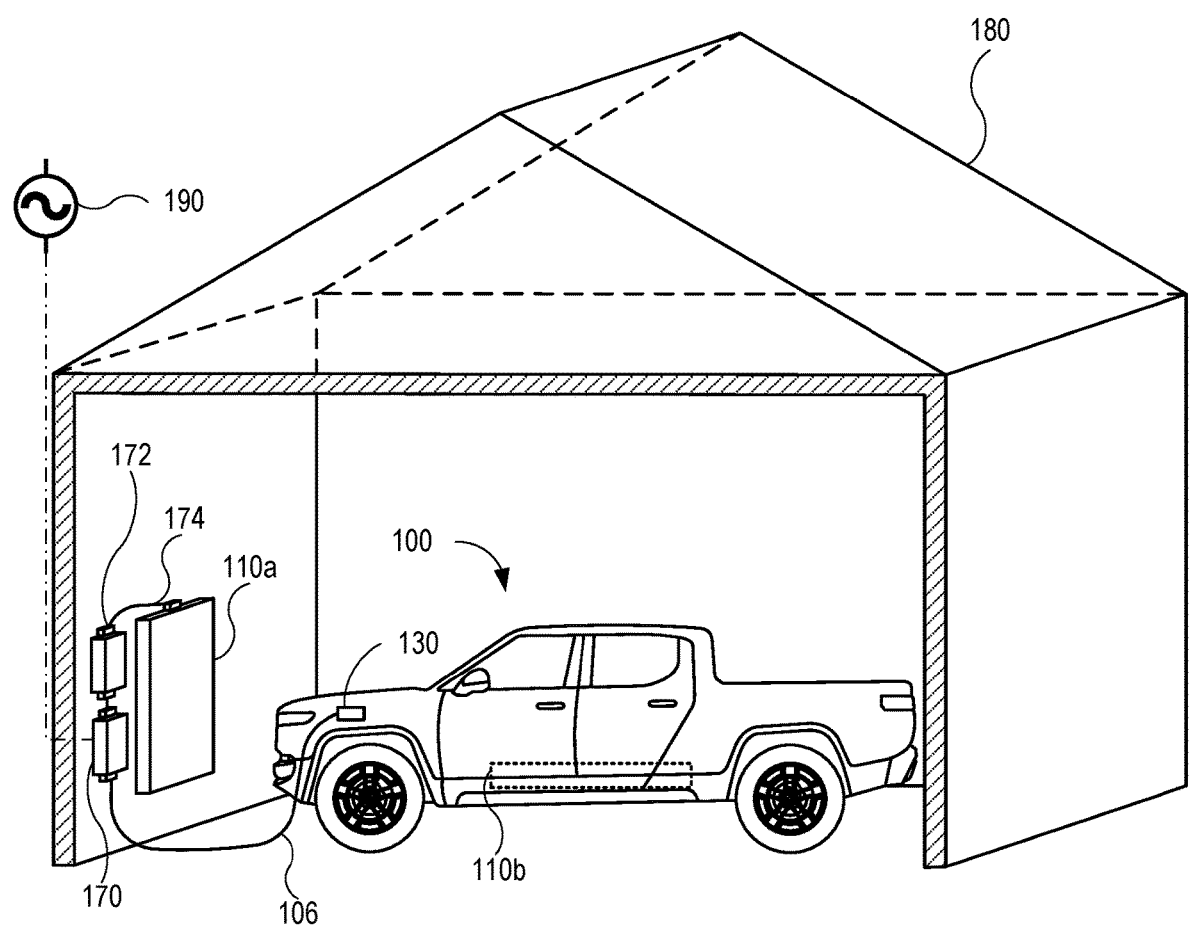
FIG. 1C illustrates a schematic perspective view of a building having a battery pack, in accordance with one or more implementations of the present disclosure.

In one or more implementations, the battery pack 110, battery modules 115, battery cells 120, and/or any other battery unit as described herein may also, or alternatively, be implemented as an electrical power supply and/or energy storage system in a building, such as a residential home or commercial building. For example, FIG. 1C illustrates an example in which a battery pack 110a is implemented in a building 180. The building 180 may be a residential building, a commercial building, or any other building. As shown, in one or more implementations, the battery pack 110a may be mounted to a wall of the building 180.

As shown, the battery pack 110a that is installed in the building 180 may be coupled (e.g., electrically coupled) to the battery pack 110b in the vehicle 100, such as via a cable/connector 106 that can be connected to a charging port 130 of the vehicle 100, an electric vehicle supply equipment 170 (EVSE), a power stage circuit 172, and/or a cable/connector 174. For example, the cable/connector 106 may be coupled to the EVSE 170, which may be coupled to the battery pack 110a via the power stage circuit 172, and/or may be coupled to an external power source 190. In this way, either the external power source 190 or the battery pack 110a may be used as an external power source to charge the battery pack 110b in some use cases. In one or more implementations, the battery pack 110a may also, or alternatively, be coupled (e.g., via a cable/connector 174, the power stage circuit 172, and the EVSE 170) to the external power source 190. The external power source 190 may take the form of a solar power source, a wind power source, and/or an electrical grid of a city, town, or other geographic region (e.g., electrical grid that is powered by a remote power plant). During, for example, instances when the battery pack 110b is not coupled to the battery pack 110a, the battery pack 110a may couple (e.g., using the power stage circuit 172) to the external power source 190 to charge up and store electrical energy. In some use cases, this stored electrical energy in the battery pack 110a may later be used to charge the battery pack 110b (e.g., during times when solar power or wind power is not available, in the case of a regional or local power outage for the building 180, and/or during a period of high rates for access to the electrical grid).

In one or more implementations, the power stage circuit 172 may electrically couple the battery pack 110a to an electrical system of the building 180. For example, the power stage circuit 172 may convert DC power from the battery pack 110a into AC power for one or more loads in the building 180. Exemplary loads coupled, via one or more electrical outlets coupled, to the battery pack 110a may include one or more lights, lamps, appliances, fans, heaters, air conditioners, and/or any other electrical components or electrical loads. The power stage circuit 172 may include control circuitry that is operable to switchably couple the battery pack 110a between the external power source 190 and one or more electrical outlets and/or other electrical loads in the electrical system of the building 180. In one or more implementations, the vehicle 100 may include a power stage circuit (not shown in FIG. 1C) that can be used to convert power received from the EVSE 170 to DC power that is used to power/charge the battery pack 110b, and/or to convert DC power from the battery pack 110 into AC power for one or more electrical systems, components, and/or loads of the vehicle 100.

In one or more use cases, the battery pack 110a may be used as a source of electrical power for the building 180, such as during times when solar power or wind power is not available, in the case of a regional or local power outage for the building 180, and/or during a period of high rates for access to the electrical grid, as non-limiting examples. In one or more other use cases, the battery pack 110b may be used to charge the battery pack 110a and/or to power the electrical system of the building 180 (e.g., in a use case in which the battery pack 110a is low on or out of stored energy and in which solar power or wind power is not available, a regional or local power outage occurs for the building 180, and/or a period of high rates for access to the electrical grid occurs, as non-limiting examples.

Figure 2A:
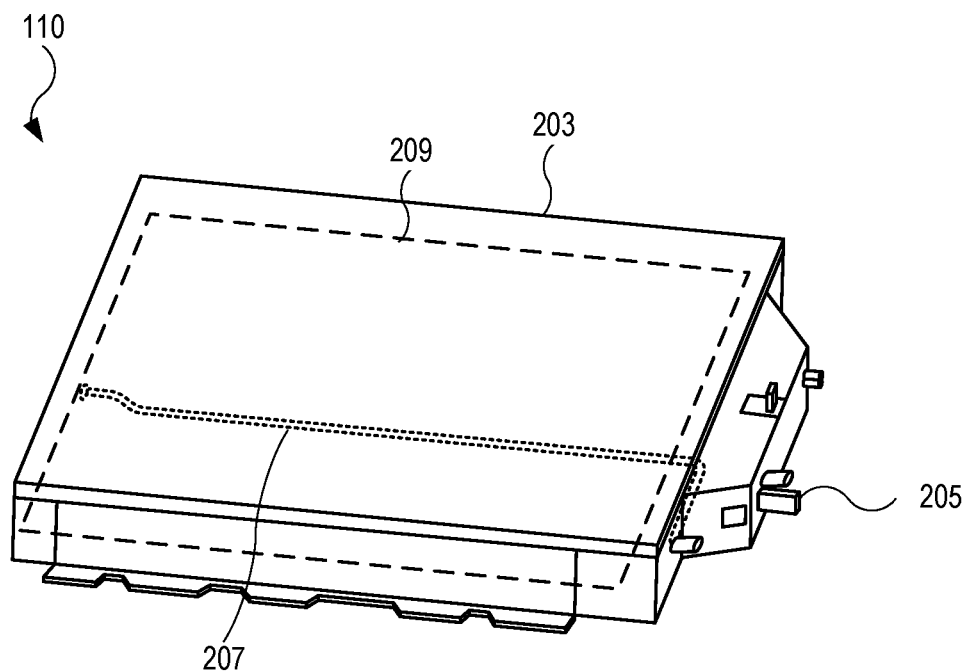
FIG. 2A illustrates a schematic perspective view of a battery pack, in accordance with one or more implementations of the present disclosure.

FIG. 2A illustrates an example of a battery pack 110. As shown, the battery pack 110 may include a battery pack frame 203 (e.g., a battery pack housing or pack frame). The battery pack frame 203 may house or enclose one or more battery modules and/or one or more battery cells, and/or other battery pack components of the battery pack 110. In one or more implementations, the battery pack frame 203 may include or form a shielding structure on an outer surface thereof (e.g., a bottom thereof and/or underneath one or more battery module, battery units, batteries, and/or battery cells) to protect the battery module, battery units, batteries, and/or battery cells from external conditions (e.g., if the battery pack 110 is installed in a vehicle and the vehicle is driven over rough terrain, such as off-road terrain, trenches, rocks, rivers, streams, etc.).

The battery pack 110 may include battery cells (e.g., directly installed within the battery pack 110, or within batteries, battery units, and/or battery modules as described herein) and/or battery modules, and one or more conductive coupling elements for coupling a voltage generated by the battery cells to a power-consuming component, such as the vehicle 100 (shown in FIGS. 1A, 1B, and 1C) and/or an electrical system of the building 180 (shown in FIG. 1C). For example, the conductive coupling elements may include internal connectors and/or contactors that couple together multiple battery cells, battery units, batteries, and/or multiple battery modules within the battery pack frame 203 to generate a desired output voltage for the battery pack 110. The battery pack 110 may also include one or more external connection ports, such as an electrical contact 205 (e.g., a high voltage terminal or connector). As shown, the battery pack 110 may include an electrical contact 205 may electrically couple an external load (e.g., the vehicle or an electrical system of the building) to the battery modules and/or battery cells in the battery pack 110. In this regard, an electrical cable (e.g., cable/connector 106) may be connected between the electrical contact 205 and an electrical system of a vehicle or a building, to provide electrical power to the vehicle or the building.

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules, battery units, batteries, and/or battery cells within the battery pack frame 203, such as by distributing fluid through the battery pack 110. The thermal control structures 207 may form a part of a thermal/temperature control or heat exchange system that includes one or more thermal components 209, which may include plates or bladders that are disposed in thermal contact with one or more battery modules and/or battery cells disposed within the battery pack frame 203. The one or more thermal components 209 may be positioned in contact with one or more battery modules, battery units, batteries, and/or battery cells within the battery pack frame 203. The one or multiple thermal control structures 207 may be provided for each of several top and bottom battery module pairs.

Figure 2B:
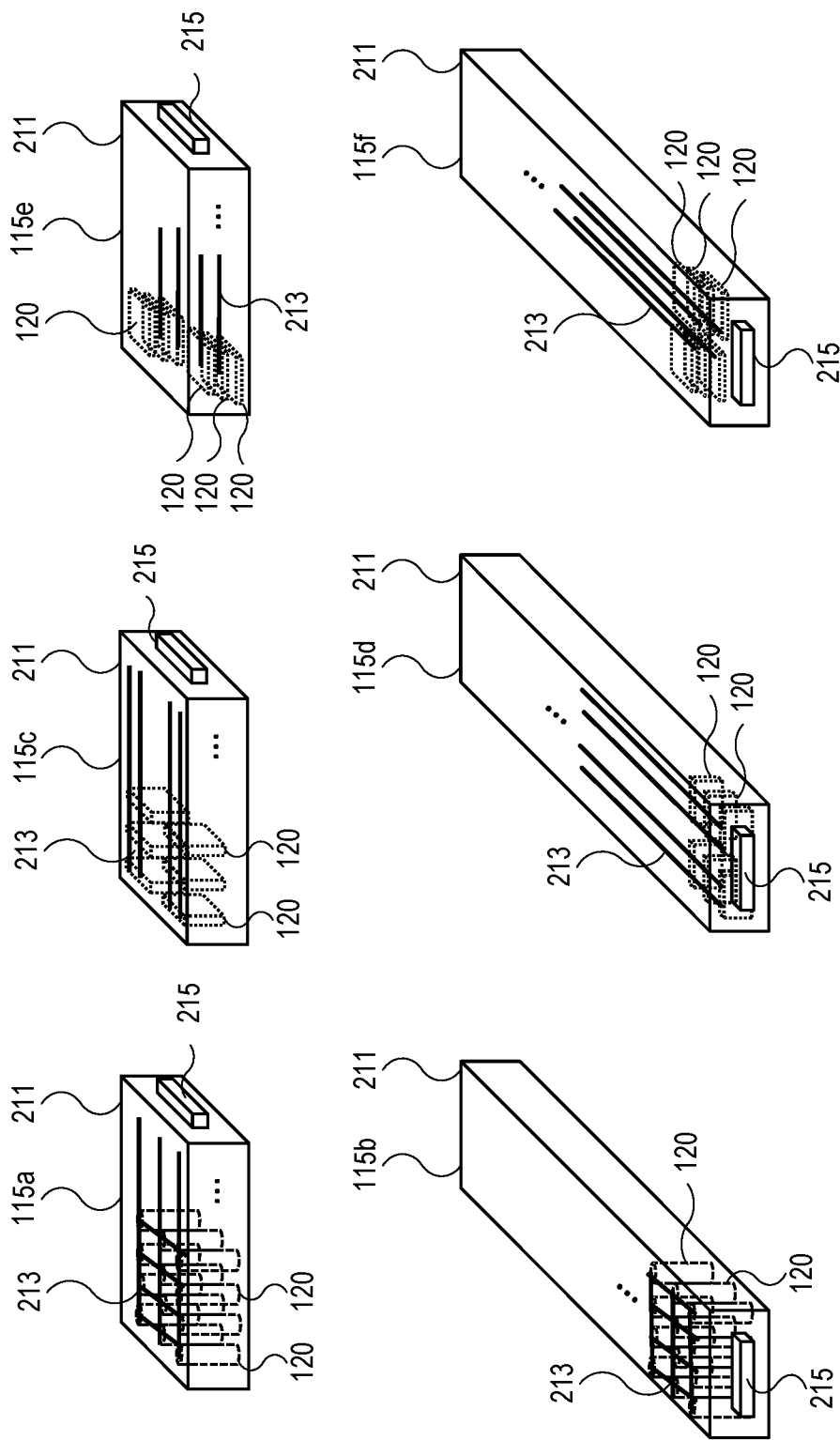
FIG. 2B illustrates schematic perspective views of various battery modules that may be included in a battery pack, in accordance with one or more implementations of the present disclosure.

FIG. 2B depicts various examples of battery modules that may be disposed in a battery pack (e.g., within the battery pack frame 203 of the battery pack 110, shown in FIG. 2A). In an example of FIG. 2B, a battery module 115a is shown that includes a battery module housing 211 having a rectangular cuboid shape with a length that is substantially similar to its width. In this example, the battery module 115a includes battery cells 120 implemented as cylindrical battery cells. The battery module 115a further includes rows and columns of cylindrical battery cells that are coupled together by an interconnect structure 213 (e.g., a current connector assembly or CCA). For example, the interconnect structure 213 may couple together the positive terminals of the battery cells 120, and/or couple together the negative battery terminals of the battery cells 120. As shown, the battery module 115a may further include a bus bar 215 that functions as a charge collector. For example, the bus bar 215 may be electrically coupled to the interconnect structure 213 to collect the charge generated by the battery cells 120 to provide a high voltage output from the battery module 115a.

FIG. 2B also shows a battery module 115b having an elongate shape. The battery module 115b may include a battery module housing 211 in which the length of the (e.g., extending along a direction from a front end to a rear end of the battery module housing 211) is substantially greater than a width (e.g., in a transverse direction to the direction from the front end to the rear end) of the battery module housing 211). In this regard, the battery module 115b (representative of one or more similar battery modules) may span the entire front-to-back length of a battery pack within a battery pack frame. As shown, the battery module 115a may further include an interconnect structure 213 electrically coupled to a bus bar 215, allowing the bus bar 202 may be electrically coupled to the interconnect structure 213 to collect the charge generated by battery cells 120 of the battery module 115b to provide a high voltage output from the battery module 115b.

In the implementations of battery module 115a and battery module 115a, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115c having a battery module housing 211 with a rectangular cuboid shape with a length that is substantially similar to its width and including battery cells 120 implemented as prismatic battery cells. In this example, the battery module 115c includes rows and columns of battery cells 120 that are coupled together by an interconnect structure 213 (e.g., a current collector assembly or CCA). For example, the interconnect structure 213 may couple together the positive terminals of the battery cells 120 and/or couple together the negative battery terminals of the battery cells 120. As shown, the battery module 115c may include a bus bar 215 that functions as a charge collector. For example, the bus bar 215 may be electrically coupled to the interconnect structure 213 to collect the charge generated by the battery cells 120 to provide a high voltage output from the battery module 115c.

FIG. 2B also shows a battery module 115d including prismatic battery cells and having an elongate shape. For example, the battery module 115d includes a battery module housing 211 in which the length of the battery module housing 211 is substantially greater than a width of the battery module housing 211. In this regard, the battery module 115d (representative of one or more similar battery modules) may span the entire front-to-back length of a battery pack within a battery pack frame. As shown, the battery module 115d may also include an interconnect structure 213 and a bus bar 215 electrically coupled to the interconnect structure 213. For example, the bus bar 215 may be electrically coupled to the interconnect structure 213 to collect the charge generated by the battery cells 120 to provide a high voltage output from the battery module 115d.

As another example, FIG. 2B also shows a battery module 115e having a battery module housing 211 having a rectangular cuboid shape with a length that is substantially similar to its width. The battery module housing 211 may carry battery cells 120, each of which being implemented as pouch battery cells. In this example, the battery module 115e includes rows and columns of pouch battery cells that are coupled together by an interconnect structure 213 (e.g., a current collector assembly or CCA). For example, the interconnect structure 213 may couple together the positive terminals of the battery cells 120 and couple together the negative battery terminals of the battery cells 120. As shown, the battery module 115e may also include a bus bar 215 electrically coupled to the interconnect structure 213. For example, the bus bar 215 may be electrically coupled to the interconnect structure 213 to collect the charge generated by the battery cells 120 to provide a high voltage output from the battery module 115c.

FIG. 2B also shows a battery module 115f including pouch battery cells and having an elongate shape. For example, the battery module 115d includes a battery module housing 211 in which the length of the battery module housing 211 is substantially greater than a width of the battery module housing 211. In this regard, the battery module 115d (representative of one or more similar battery modules) may span the entire front-to-back length of a battery pack within a battery pack frame. In this regard, the battery module 115f (representative of one or more similar battery modules) may span the entire front-to-back length of a battery pack within a battery pack frame. As shown, the battery module 115f may also include an interconnect structure 213 and a bus bar 215 electrically coupled to the interconnect structure 213. For example, the bus bar 215 may be electrically coupled to the interconnect structure 213 to collect the charge generated by the battery cells 120 to provide a high voltage output from the battery module 115f.

In various implementations, a battery pack (e.g., battery pack 110 shown in FIG. 2A) may be provided with one or more of any of the battery modules 115a, 115b, 115c, 115d, 115e, and 115f. In one or more other implementations, a battery pack may be provided without any of the battery modules 115a, 115b, 115c, 115d, 115e, and 115f (e.g., in a cell-to-pack implementation).

In one or more implementations, battery modules in any of the implementations of FIG. 2B may be coupled (e.g., in series) to a current collector of a battery pack. In one or more implementations, the current collector may be coupled, via a high voltage harness, to one or more external connectors on a battery pack (e.g., electrical contact 205 of the battery pack 110, shown in FIG. 2A). In one or more implementations, a battery pack may be provided without any battery modules 115. For example, in a cell-to-pack configuration, the battery cells 120 are arranged directly into a battery pack without assembly into a battery module (e.g., without including the battery module housing 211). For example, a battery pack frame of a battery pack (e.g., the battery pack frame 203 of the battery pack 110 shown in FIG. 2A) may include or define a plurality of structures for positioning of the battery cells 120 directly within the battery pack frame.

Figure 2C:
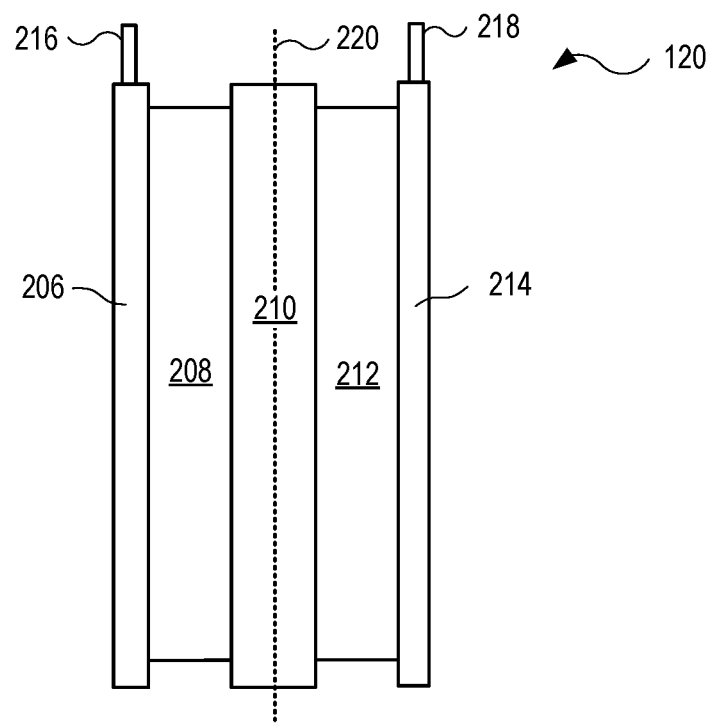
FIG. 2C illustrates a cross-sectional end view of a battery cell, in accordance with one or more implementations of the present disclosure.

FIG. 2C illustrates a cross-sectional end view of a portion of a battery cell 120. As shown, the battery cell 120 may include an anode 208, an electrolyte 210, and a cathode 212. As shown, the anode 208 may include or be electrically coupled to a first current collector 206 (e.g., a metal layer such as a layer of copper foil or other metal foil). Also, the cathode 212 may include or be electrically coupled to a second current collector 214 (e.g., a metal layer such as a layer of aluminum foil or other metal foil). The battery cell 120 may further include a terminal 216 (e.g., a negative terminal) coupled to the anode 208 (e.g., via the first current collector 206) and a terminal 218 (e.g., a positive terminal) coupled to the cathode (e.g., via the second current collector 214). In various implementations, the electrolyte 210 may take the form of a liquid electrolyte layer or a solid electrolyte layer. In one or more implementations in which the electrolyte 210 is a liquid electrolyte layer, the battery cell 120 may include a separator layer 220 that separates the anode 208 from the cathode 212. In one or more implementations in which the electrolyte 210 is a solid electrolyte layer, the electrolyte 210 may function as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. In an implementation in which the battery cell 120 is implemented as a lithium-ion battery cell, the electrolyte 210 may include a lithium salt in an organic solvent.

The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cell 120 is implemented as lithium-ion battery cells, the battery cell 120 may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials. In various implementations, the anode 208, the electrolyte 210, and the cathode 212 can be packaged into a battery cell housing having any of various shapes, and/or sizes, and/or formed from any of various suitable materials. For example, the battery cell 120 may include a cylindrical, rectangular, square, cubic, flat, pouch, elongated, or prismatic outer shape.

Figure 2D:
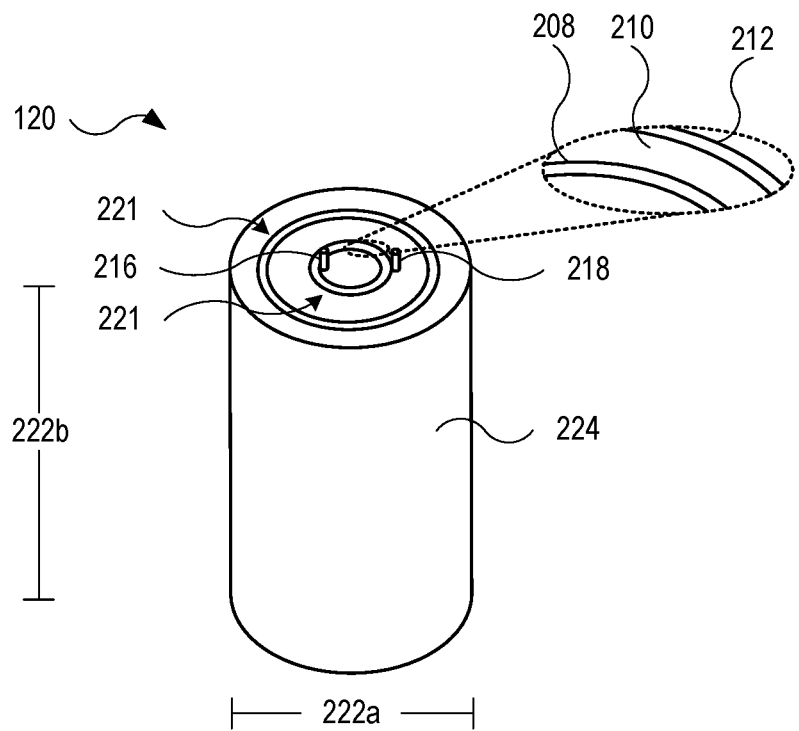
FIG. 2D illustrates a cross-sectional perspective view of a cylindrical battery cell, in accordance with one or more implementations.

As depicted in FIG. 2D, for example, a battery cell 120 may be implemented as a cylindrical cell. Accordingly, the battery cell 120 includes dimension 222*a* (e.g., cylinder diameter, battery cell diameter) and a dimension 222*b* (e.g., cylinder length). The battery cell 120, and other battery cells described herein, may include dimensional information derived from a 4-number code. For example, in some embodiments, the battery cell 120 includes an XXYY battery cell, in which "XX" refers to the dimension 222*a* in millimeters (mm) and "YY" refers to the dimension in mm. Accordingly, when the battery cell 120 includes a "2170" battery cell, the dimension 222*a* is 21 mm and the dimensions 222*b* is 70 mm. Alternatively, when the battery cell 120 includes a "4680" battery cell, the dimension 222*a* is 46 mm and the dimensions 222*b* is 80 mm. The foregoing examples of dimensional characteristics for the battery cell 120 should not be construed as limiting, and the battery cell 120, and other battery cells described herein with a cylindrical form factor, may include various dimension. For example, the dimension 222*a* and the dimension 222*b* may be greater than 46 mm and 80 mm, respectively.

FIG. 2D illustrates a battery cell 120 that includes a cell housing 224 having a cylindrical outer shape. As shown in the enlarged view, the anode 208, the electrolyte 210, and the cathode 212 may be rolled into one or more windings 221. The one or more windings 221 may include one or more substantially cylindrical windings, as a non-limiting example. As shown, one or more windings 221 of the anode 208, the electrolyte 210, and the cathode 212 (e.g., and/or one or more separator layers such as separator layer 220 shown in FIG. 2C) may be disposed within the cell housing 224. For example, a separator layer may be disposed between adjacent ones of the one or more windings 221. Additionally, the battery cell 120 in the cylindrical cell implementation of FIG. 2D includes a terminal 216 and a terminal 218. The terminal 218 may include a first polarity terminal, such as a positive terminal, that is coupled to the cathode 212. The terminal 216 may include a second polarity terminal, such as a negative terminal, that is coupled to the anode 208. The terminals 216 and 218 can be made from electrically conductive materials to carry electrical current from the battery cell 120 directly or indirectly (e.g., via a current carrier assembly, a bus bar, and/or other electrical coupling structures) to an electrical load, such as a component or system of a vehicle or a building shown and/or described herein. However, the cylindrical cell implementation of FIG. 2D is merely illustrative, and other implementations of the battery cells 120 are contemplated.

Figure 2E:
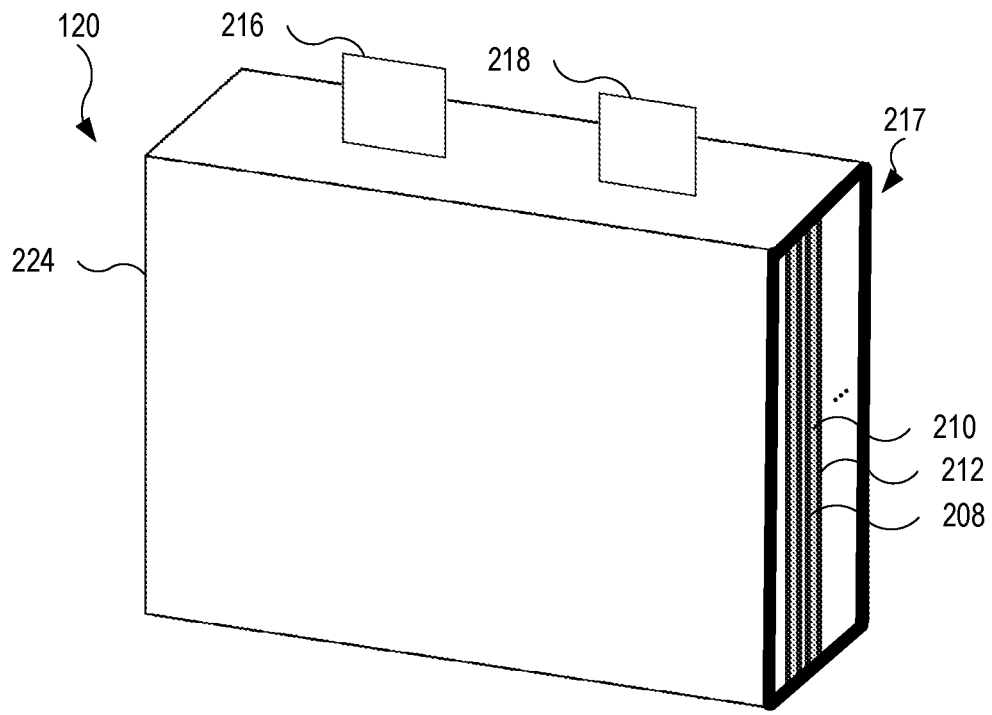
FIG. 2E illustrates a cross-sectional perspective view of a prismatic battery cell, in accordance with one or more implementations of the present disclosure.

FIG. 2E illustrates an example in which the battery cell 120 is implemented as a prismatic cell. As shown, the battery cell 120 may include a cell housing 224 having a right prismatic outer shape. Also, one or more layers of the anode 208, the cathode 212, and the electrolyte 210 disposed therebetween may be disposed (e.g., with separator materials between the layers) within the cell housing 224. As examples, multiple layers of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 224. The cell housing 224 may include a cross-sectional width 217 that is relatively thick and is formed from a rigid material. For example, the cell housing 224 may be formed from a welded, stamped, deep drawn, and/or impact extruded metal sheet, such as a welded, stamped, deep drawn, and/or impact extruded aluminum sheet. The cross-sectional width 217 of the cell housing 224 may be as much as, or more than 1 millimeter (mm) to provide a rigid housing for the prismatic battery cell. In one or more implementations, a terminal 216 and a terminal 218 in the prismatic cell implementation of FIG. 2E may be formed from a feedthrough conductor that is insulated from the cell housing 224 (e.g., a glass to metal feedthrough) as the conductor passes through to cell housing 224 to expose the terminal 216 and the terminal 218 outside the cell housing 224 in order to contact an interconnect structure (e.g., interconnect structure 213 shown in FIG. 2B). However, this implementation of FIG. 2E is also illustrative and yet other implementations of the battery cell 120 are contemplated.

Figure 2F:
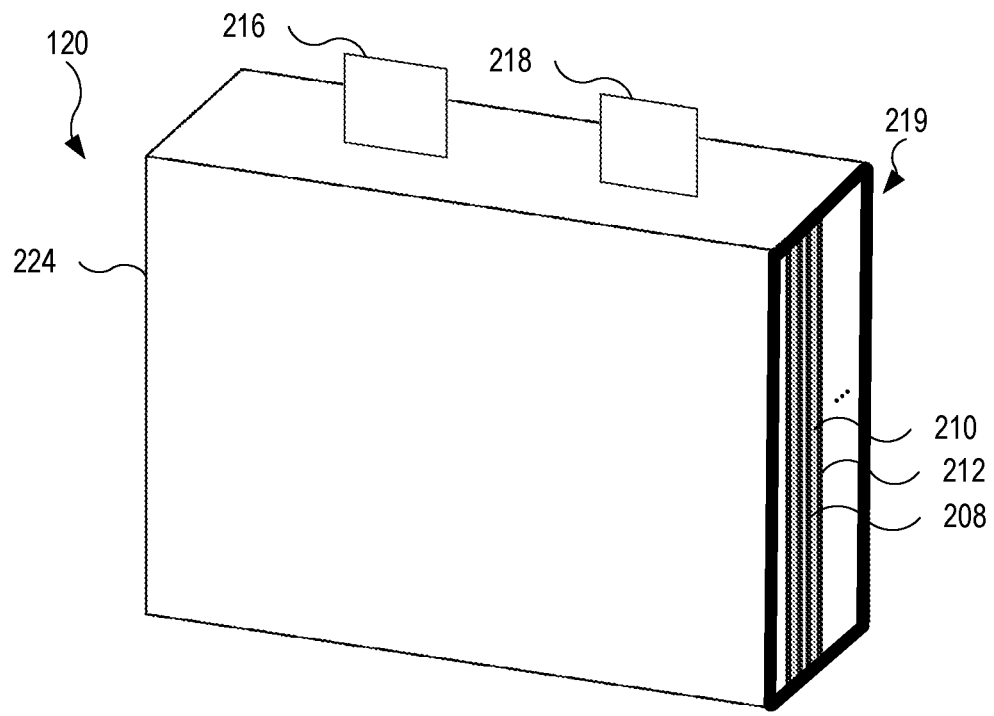
FIG. 2F illustrates a cross-sectional perspective view of a pouch battery cell, in accordance with one or more implementations of the present disclosure.

FIG. 2F illustrates an example in which the battery cell 120 is implemented as a pouch cell. As shown, the battery cell 120 may include a cell housing 224 that forms a flexible or malleable pouch housing. One or more layers of the anode 208, the cathode 212, and the electrolyte 210 disposed therebetween may be disposed (e.g., with separator materials between the layers) within the cell housing 224. In the implementation of FIG. 2F, the cell housing 224 may include a cross-sectional width 219 that is relatively thin. For example, the cell housing 224 in the implementation of FIG. 2F may be formed from a flexible or malleable material (e.g., a foil, such as a metal foil, or film, such as an aluminum-coated plastic film). The cross-sectional width 219 of the cell housing 224 may be as low as, or less than, 0.1 mm, 0.05 mm, 0.02 mm, or 0.01 mm to provide flexible or malleable housing for the pouch battery cell. In one or more implementations, a terminal 216 and a terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 224 in these implementations. In the examples of FIGS. 2C, 2E, and 2F, the terminal 216 and the terminal 218 are formed on the same side (e.g., a top side) of the battery cell 120. However, this is merely illustrative and, in other implementations, the terminal 216 and the terminal 218 may formed on two different sides (e.g., opposing sides, such as a top side and a bottom side) of the battery cell 120. The terminal 216 and the terminal 218 may be formed on a same side or difference sides of the cylindrical cell of FIG. 2D in various implementations.

In one or more implementations, a battery module, a battery pack, a battery unit, or any other battery may include some battery cells that are implemented as solid-state battery cells and other battery cells that are implemented with liquid electrolytes for lithium-ion or other battery cells having liquid electrolytes. In one or more implementations, one or more of the battery cells may be included a battery module or a battery pack, such as to provide an electrical power supply for components of a vehicle and/or a building previously described, or any other electrically powered component or device. A cell housing of the battery cell can be disposed in the battery module, the battery pack, or installed in any of the vehicle, the building, or any other electrically powered component or device.

Figure 3:
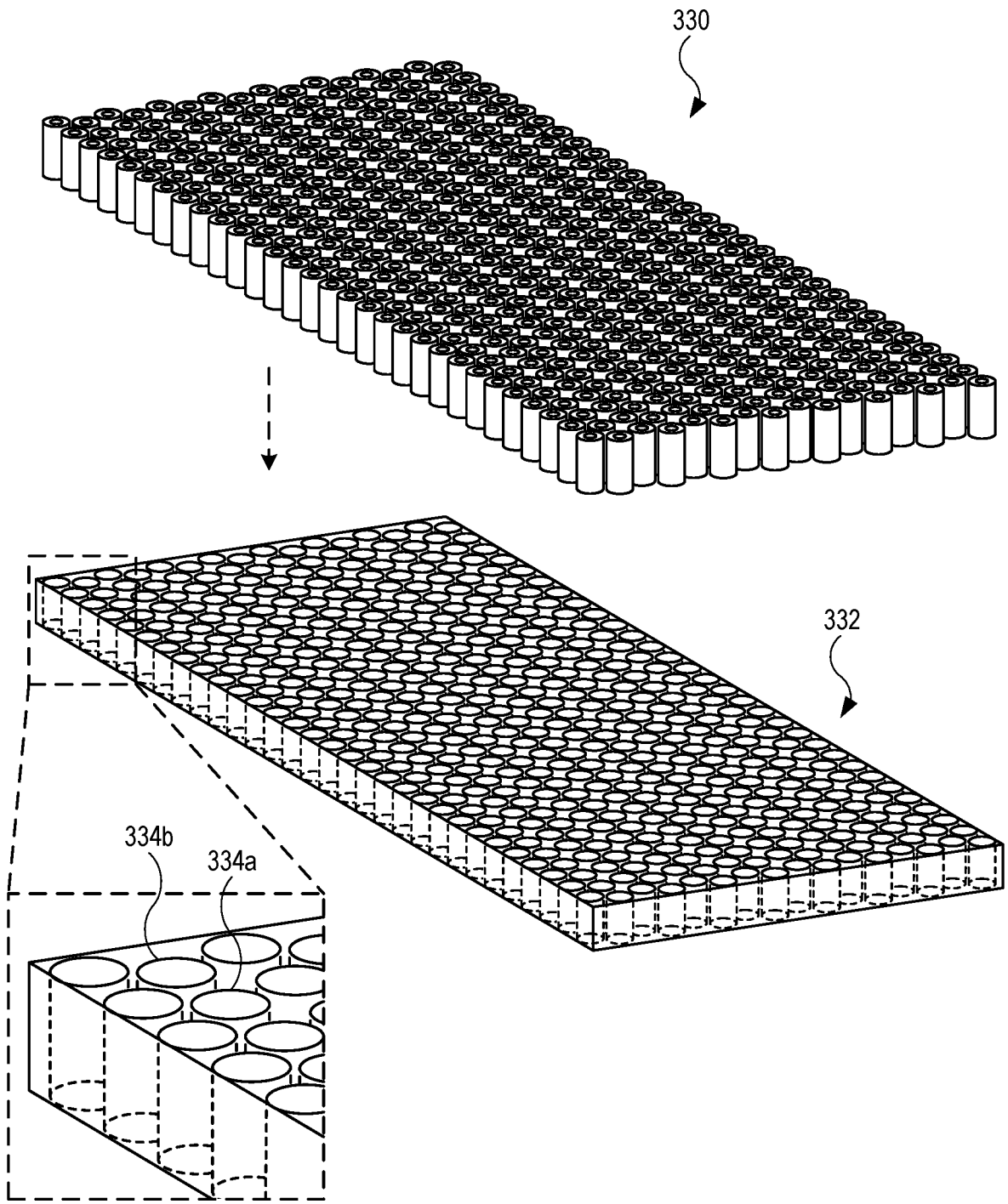
FIG. 3 illustrates a perspective view of battery cells and an apparatus for the battery cells, in accordance with one or more implementations of the present disclosure.

FIG. 3 illustrates a perspective view of battery cells 330 and an apparatus 332 for the battery cells 330, in accordance with one or more implementations of the present disclosure. As shown, the battery cells 330 (e.g., implementations of the battery cells 120 described herein) include several discrete battery cells, each having a cylindrical housing. The battery cells 330 may be disposed in a battery module (e.g., battery module 115 described herein). In one or more implementations, the apparatus 332 includes a potting structure for the battery module. In this regard, the apparatus 332 may provide characteristics such as ingress protection, protection from a thermal event, and electrical insulation. The apparatus 332 may include multiple openings, each of which being designed to receive a battery cell of the battery cells 330. For example, as shown in the enlarged view, the apparatus 332 includes an opening 334a and an opening 334b, representative of several additional openings. As shown, the openings 334a and 334b are circular openings. However, other shapes are possible (e.g., openings shaped to receive prismatic and/or pouch cells). Generally, the number of openings of the apparatus 332 corresponds to the number of battery cells of the battery cells 330. Also, the diameter of each of the openings of the apparatus 332 allows for each opening of the apparatus 332 to receive a respective battery cell of the battery cells 330. In this regard, based on the openings, the apparatus 332 may receive each battery cell of the battery cells 330.

Figure 4A:
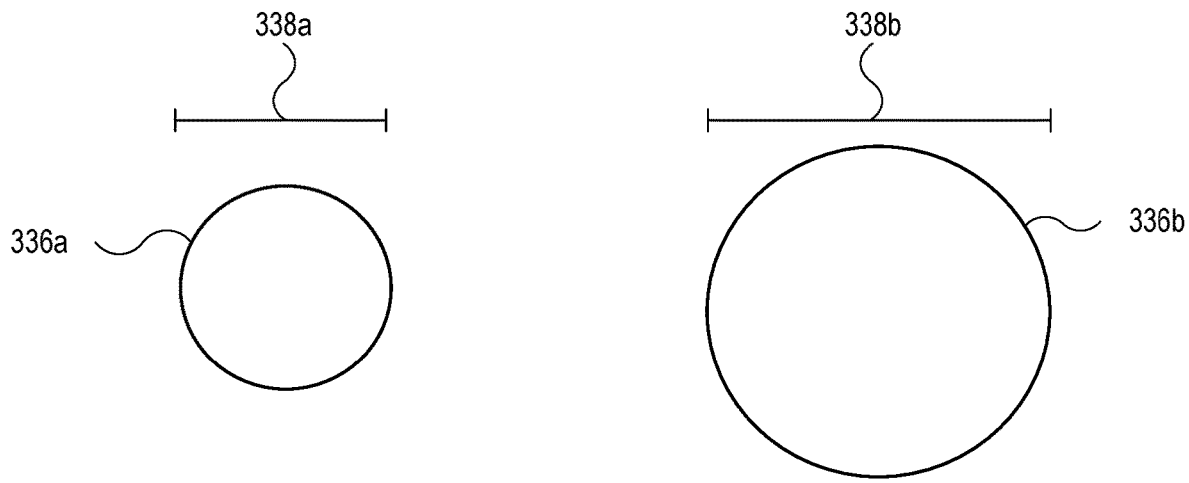
FIGS. 4A and 4B illustrate an example of beads, in accordance with one or more implementations of the present disclosure.

In one or more implementations, the apparatus 332 is formed by a molding operation in which several beads are provided. For example, FIG. 4A illustrates an example of beads, in accordance with one or more implementations of the present disclosure. A bead 336a and a bead 336b are shown. Each of the beads 336a and 336b may be representative of several additional beads used to form the apparatus 332 (shown in FIG. 3), as well as other apparatuses shown and/or described herein. Each of the beads 336a and 336b may include the same basic chemistry. For example, in one or more implementations, the beads 336a and 336b are formed from m-PPE. Each of the beads 336a and 336b may be modified (e.g., from raw pellets) by impregnation of a gas (e.g., inorganic gas). Other exemplary materials used to form the beads 336a and 336b may include PPE, polyurethane, polystyrene, or polypropylene. Also, in one or more implementations, each of the beads 336a and 336b includes a foamed bead, and more particularly, a closed cell foamed bead.

While the chemistry of the beads 336a and 336b may be the same, some differences between the beads 336a and 336b may exist. For example, the bead 336a and the bead 336b may include a dimension 338a and a dimension 338b, respectively. When the bead 336a and the bead 336b are circular, the dimension 338a and the dimension 338b may represent a respective diameter of the beads 336a and 336b. When the bead 336a and the bead 336b are non-circular, the dimension 338a and the dimension 338b may represent a respective major dimension (e.g., largest dimension) of the beads 336a and 336b. As non-limiting examples, the dimension 338a of the bead 336a may be in the range of 1.0 to 1.5 mm, and the dimension 338b of the bead 336b may be in the range of 2.0 to 4.0 mm.

Additionally, the respective densities of the beads 336a and 336b may differ. For example, the bead 336a may include a density in a density range from 0.3 grams per cubic centimeter (g/cm$^3$) to 1.4 g/cm$^3$. In this regard, beads within the density range for the bead 336a may include a density less than 1.0 g/cm$^3$ or greater than 1.0 g/cm$^3$. Conversely, the bead 336b may include a density in a density range from 0.1 g/cm$^3$ to 0.3 g/cm$^3$. Accordingly, in one or more implementations, the bead 336a is smaller, but denser, than the bead 336b. Put another way, the bead 336b may be larger, but less dense than, the bead 336a.

In one or more implementations, the beads 336a and 336b may form an apparatus other than the apparatus 332 (shown in FIG. 3). For example, as shown and described in further detail below, the beads 336a and 336b may form an apparatus that takes the form of a battery pack enclosure, or battery pack housing. When an apparatus takes the form of a battery pack enclosure, the bead 336a may include a density in a density range from 1.0 grams per cubic centimeter (g/cm$^3$) to 1.4 g/cm$^3$. Conversely, the bead 336b may include a density in a density range from 0.1 g/cm$^3$ to 0.8 g/cm$^3$. Based on the respective ranges, for an apparatus that takes the form of a battery pack enclosure, the density range for the bead 336a may be non-overlapping with respect to the density range for the beads 336b. However, in other implementations, the respective density ranges may be overlapping ranges.

Figure 4B:
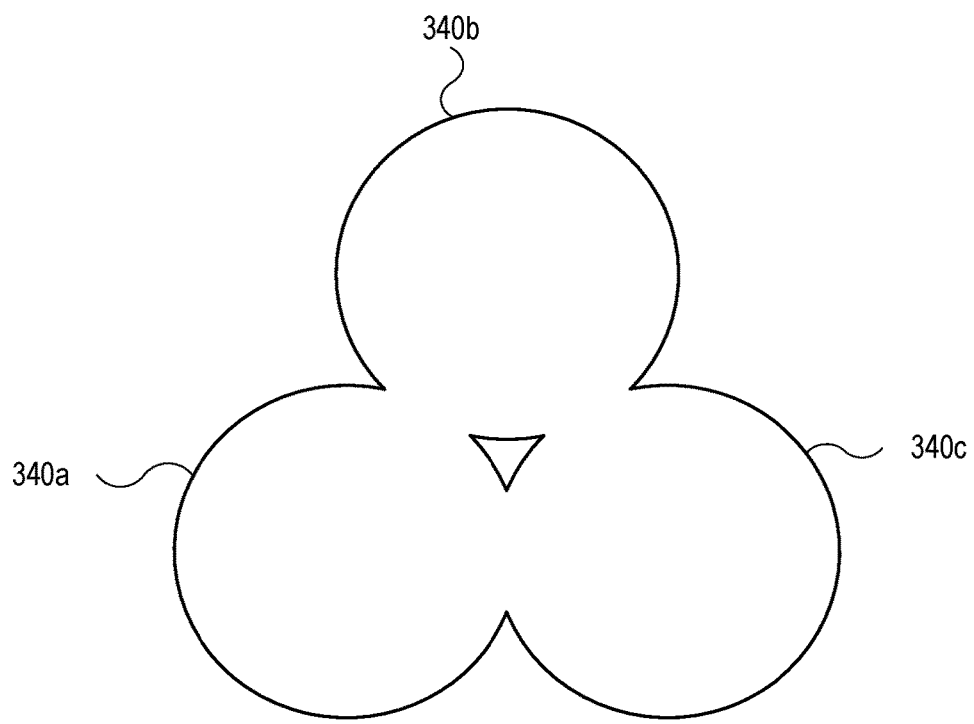

Referring to FIG. 4B, a bead 340a, a bead 340b, and a bead 340c are fused together. Each of the beads 340a, 340b, and 340c may include any properties shown and/or described for the bead 336a or the bead 336b. Accordingly, each of the beads 340a, 340b, and 340c may include the same chemistry. As a result, each of the beads 340a, 340b, and 340c may fuse together to form a single structure. Beneficially, by fusing together, the beads 340a, 340b, and 340c may not require adhesives or fasteners to remain together. Also, although not shown, at least some beads shown and/or described herein may be part of different density ranges and/or dimensions, but may fuse together based on having the same chemistry.

When forming an apparatus shown and/or described herein, when the beads 340a, 340b, and 340c include the properties of the bead 336a (shown in FIG. 4A), the beads 340a, 340b, and 340c may be densely compacted together. Conversely, when the beads 340a, 340b, and 340c include the properties of the bead 336b (shown in FIG. 4A), the beads 340a, 340b, and 340c may include a loose bulk density that is uncompacted (or relatively uncompacted).

Figure 5:
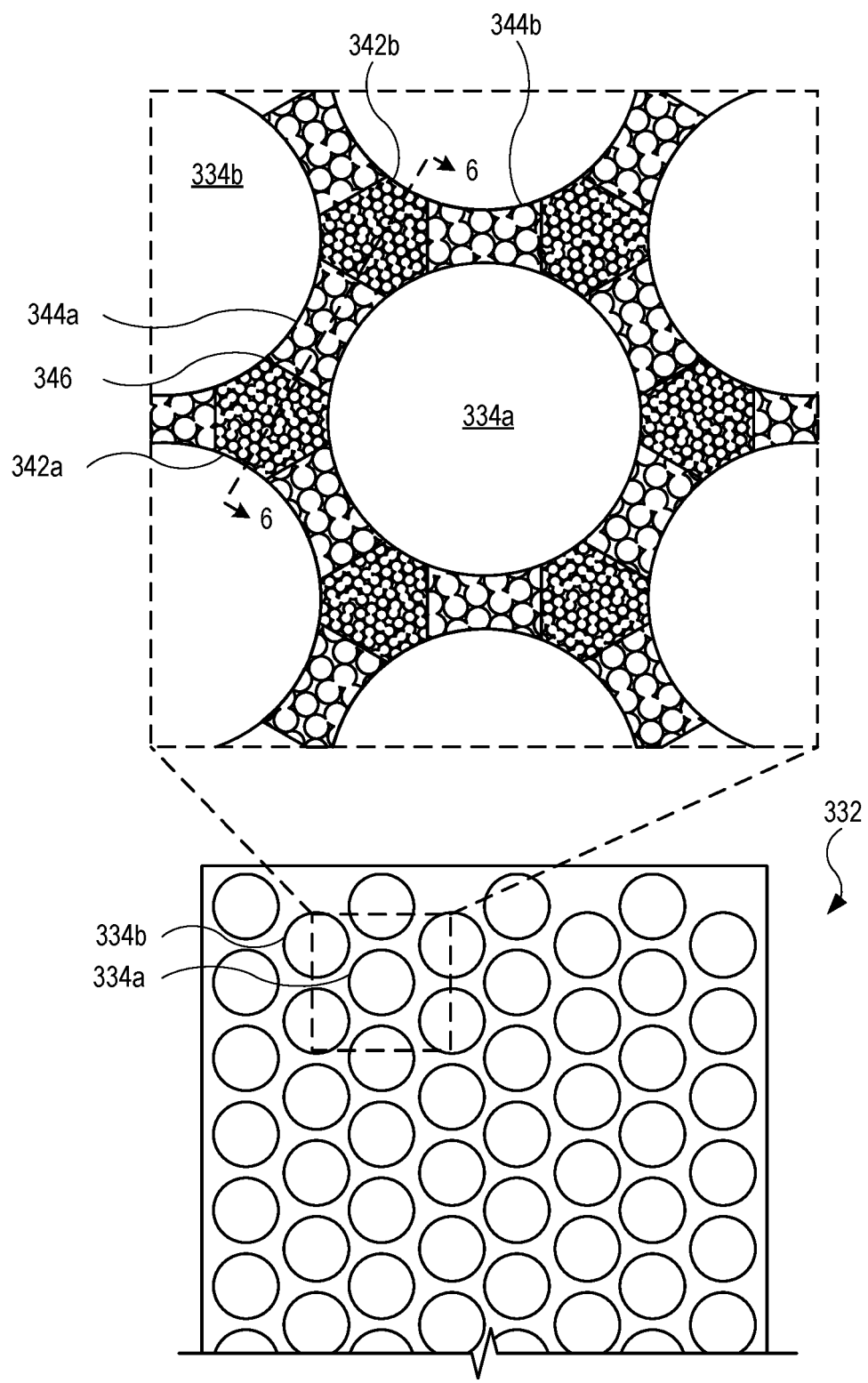
FIG. 5 illustrates an aerial view of an apparatus, in accordance with one or more implementations of the present disclosure.

FIG. 5 illustrates an aerial view of the apparatus 332, in accordance with one or more implementations of the present disclosure. The apparatus 332 may include several pillars and several walls. For example, as shown in the enlarged view, the apparatus 332 includes a pillar 342a and a pillar 342b, representative of several additional pillars. Also, the apparatus 332 may include a wall 344a and a wall 344b, representative of several additional walls. Each of the pillars 342a and 342b and each of the walls 344a and 344b may be formed from several beads (shown, not labeled). Moreover, each of the beads used to form the pillars 342a and 342b may include the properties for the bead 336a (shown in FIG. 4A), and each of the beads used to form the walls 344a and 344b may include the properties for the bead 336b (shown in FIG. 4A). Accordingly, the pillars 342a and 342b may include beads with a dimension relatively smaller than that of the beads used to form the walls 344a and 344b. Also, the pillars 342a and 342b may include beads with a density in a relatively higher density range, while the walls 344a and 344b may include beads with a density in a relatively lower density range.

Based on their respective properties, the pillars 342a and 342b may provide different functions for the apparatus 332. For example, the pillars 342a and 342b may provide structural rigidity and mechanical support, based on having beads in a relatively high density range. Further, the walls 344a and 344b may provide elasticity and flexibility, based on having beads in a relatively low density range. Additionally, the wall 344a and 344b may protect the battery cells (shown in FIG. 3) from vibration during operation of a vehicle.

The apparatus 332 may include several openings, such as the openings 334a and 334b, representative of several additional openings. The pillars (e.g., pillars 342a and 342b) and the walls (e.g., walls 344a and 344b) may combine to define the openings (e.g., openings 334a and 334b) of the apparatus 332. Each of the openings 334a and 344b may include a circular opening designed to receive a battery cell (e.g., a cylindrical battery cell). When a battery cell is positioned in the opening 334a, the pillars 342a and 342b may provide mechanical stiffness for the battery cell, while the walls 344a and 344b may provide flexibility, including compression or expansion, in response to an increase or decrease, respectively, in the diameter of the battery cell.

Additionally, the beads used to form the pillars 342a and 342b as well as the beads used to form the walls 344a and 344b may include the same chemistry. As a result, the beads used to form the pillar 342a may fuse together (similar to the beads 340a, 340b, and 340c shown in FIG. 4B), and the beads used to form the pillar 342b may fuse together. Similarly, the beads used to form the wall 344a may fuse together, and the beads used to form the wall 344b may fuse together. Moreover, based on the use of the same chemistry of beads, the beads at a boundary between a pillar and a wall may also fuse together. For example, the beads at a boundary 346 between the pillar 342a and the wall 344a may fuse together. Thus, the apparatus 332 may not require elements, such as adhesives or fasteners, to maintain the structural components (e.g., pillars and walls) together. Also, in one or more implementations, the beads used to form the pillars 342a and 342b may be substituted for a pre-molded polymer. The pre-molded polymer may include a density in a range similar to that of the bead 336a (shown in FIG. 4A).

Figure 6:
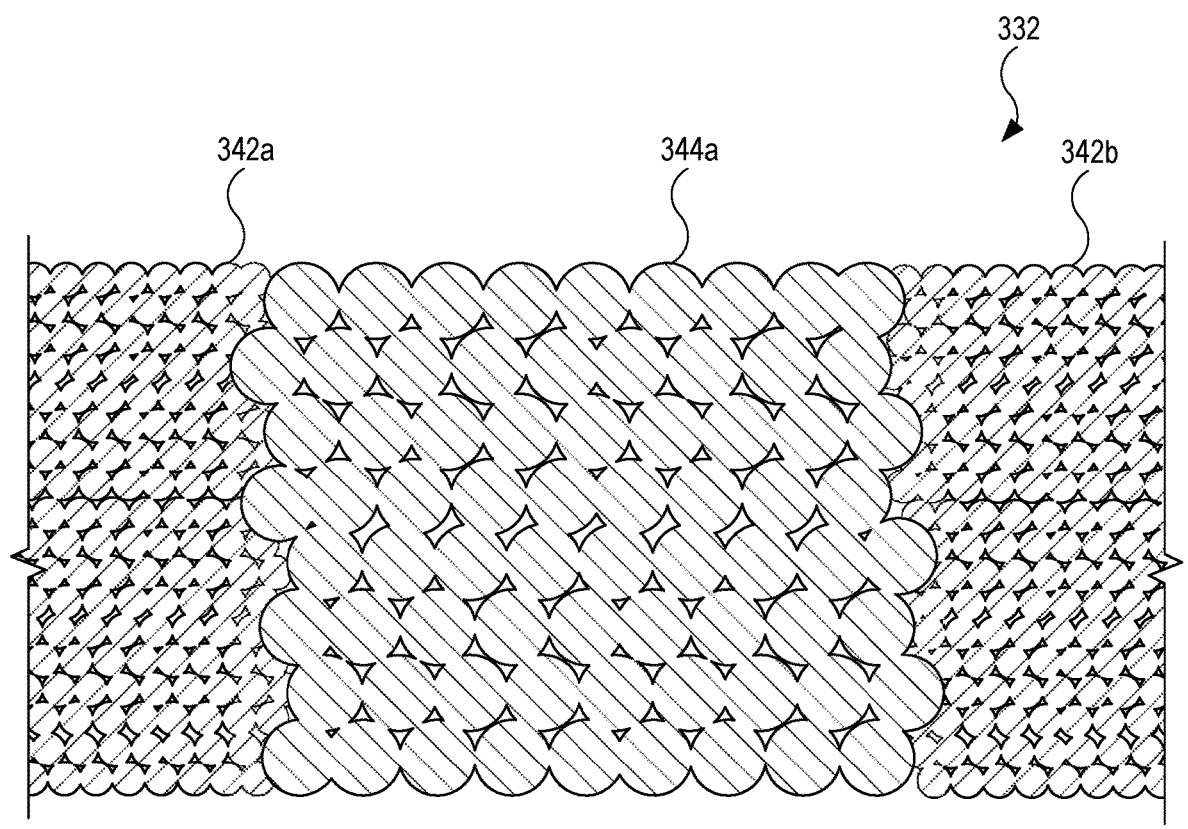
FIG. 6 illustrates a cross sectional view of the apparatus shown in FIG. 5, taken along line 6-6 in FIG. 5, showing pillars and walls of the apparatus, in accordance with one or more implementations of the present disclosure.

FIG. 6 illustrates a cross sectional view of the apparatus 332 shown in FIG. 5, taken along line 6-6 in FIG. 5, showing the pillars 342a and 342b and the wall 344a positioned between the pillars 342a and 342b. As shown, the pillars 342a and 342b and the wall 344a, each having beads fused together, form vertical structures that defines a dimension (e.g., height) of the apparatus 332.

Figure 7:
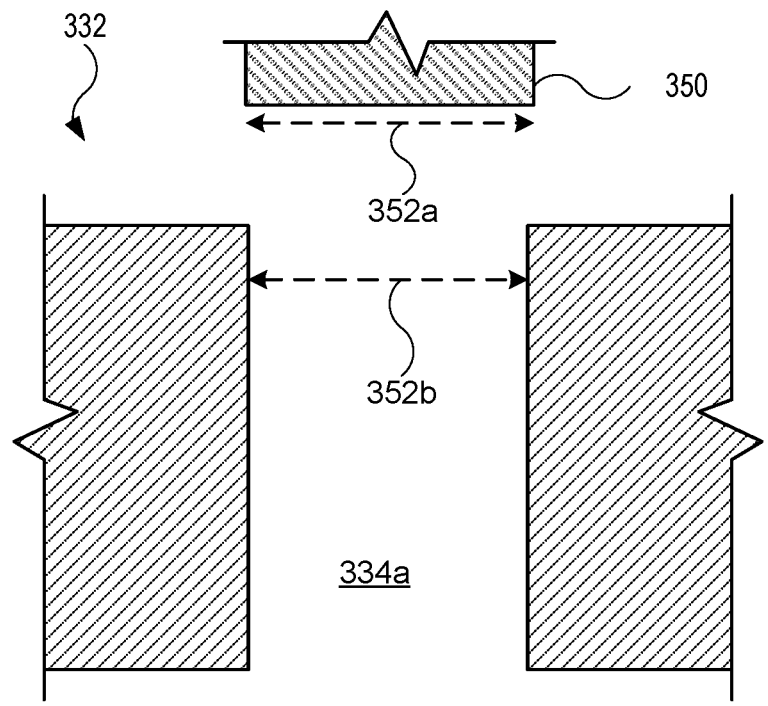
FIG. 7 and FIG. 8 illustrate cross sectional views of an opening of an apparatus, further showing a battery cell that may be received in the opening, in accordance with one or more implementations of the present disclosure.

FIG. 7 illustrates a cross sectional view of the opening 334a of the apparatus 332, further showing a battery cell 350, in accordance with one or more implementations of the present disclosure. As shown, the battery cell 350 includes a dimension 352a (e.g., battery cell diameter) and the opening 334a includes a dimension 352b (e.g., opening diameter). The dimension 352a of the battery cell 350 may be a representative diameter of each battery cell of the battery cells 330 (shown in FIG. 3). Also, the dimension 352b of the opening 334a may be a representative diameter of each opening of the apparatus 332 (shown in FIG. 3). In one or more implementations, the dimension 352b of the opening 334a is greater than or equal to the dimension 352a of the battery cell 350. In the example implementation shown in FIG. 7, the dimension 352b of the opening 334a is less the dimension 352a of the battery cell 350. However, the battery cell 350 may nonetheless enter the opening 334a.

Figure 8:
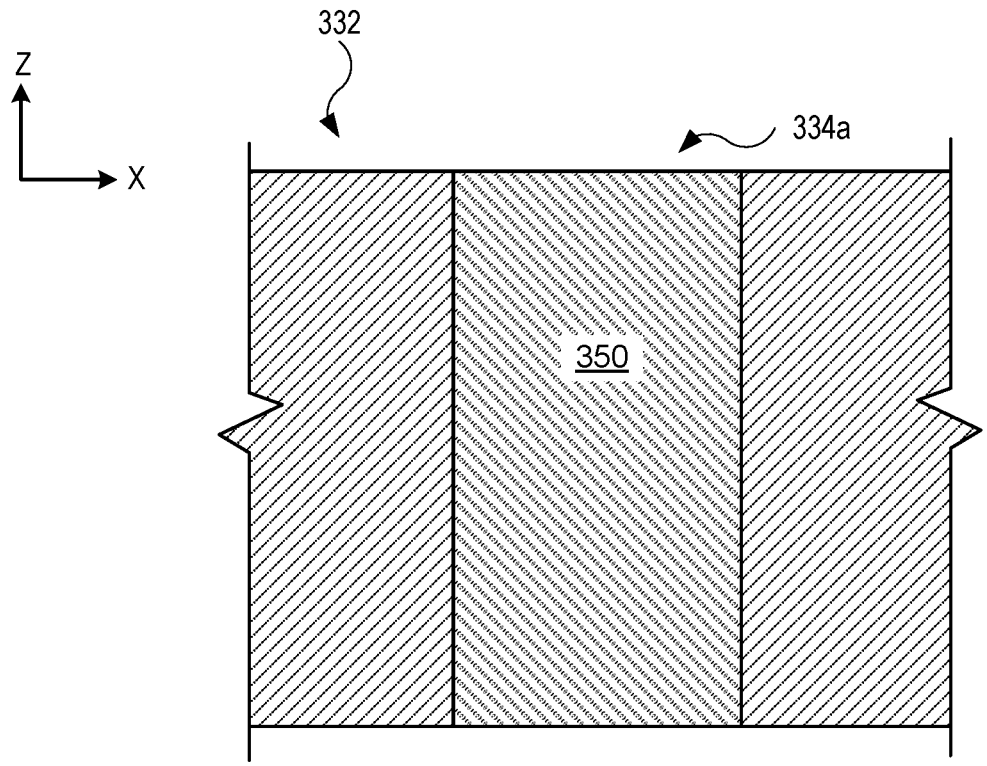

FIG. 8 illustrates the battery cell 350 positioned in the opening 334a. Based on the aforementioned walls (e.g., walls 344a and 344b shown in FIG. 5) being formed from relatively low density beads, the apparatus 332 may be under compression at the walls. In this regard, the battery cell 350 may remain in the opening 334a by a press fit, or interference fit, such that frictional forces between the apparatus 332 and the battery cell 350 retain the battery cell 350 in the opening 334a of the apparatus 332.

Also, the apparatus 332 and the battery cell 350 may include similar dimensions. For example, as shown in FIG. 8, the apparatus 332 may include a dimension, or height, along the Z-axis (of Cartesian coordinates) that is the same as, or at least substantially similar to, a dimension, or height, along the Z-axis of the battery cell 350. However, in one or more implementations (not shown in FIG. 8), the apparatus 332 may include a dimension, or height, that is greater than or less than a dimension, or height, of the battery cell 350.

Figure 9:
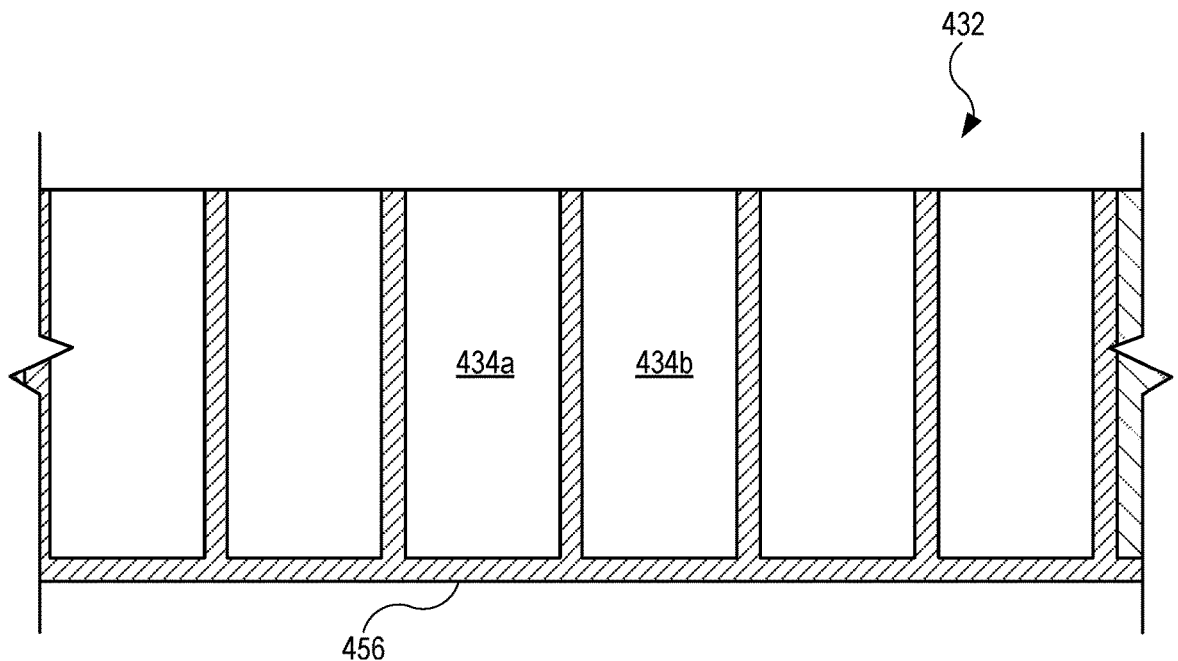
FIG. 9 illustrates a cross sectional view of an alternate example of an apparatus having a base for battery cells, in accordance with one or more implementations of the present disclosure.
Figure 10:
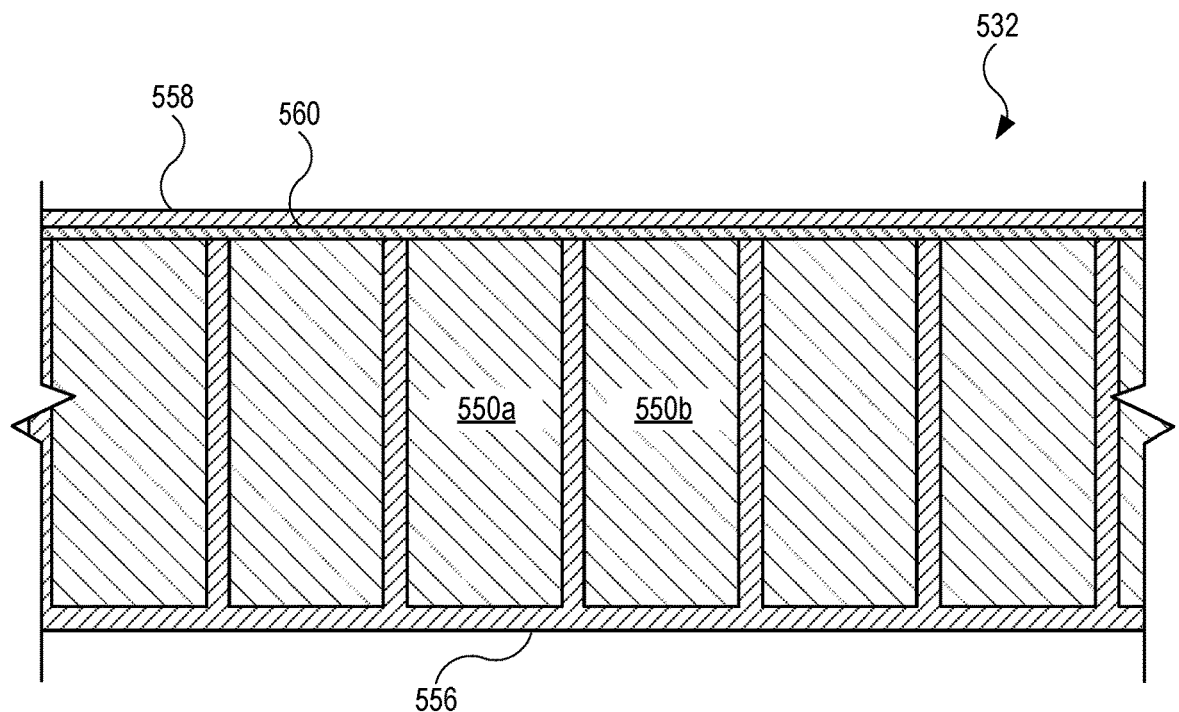
FIG. 10 illustrates a cross sectional view of an alternate example of an apparatus having a base and a cover for battery cells, in accordance with one or more implementations of the present disclosure.

FIGS. 9 and 10 illustrate alternate examples of apparatuses that take the form of potting structures. The potting structures shown and described in FIGS. 9 and 10 may include any materials previously shown and/or described for potting structures.

FIG. 9 illustrates a cross sectional view of an apparatus 432 having a base 456 for battery cells, in accordance with one or more implementations of the present disclosure. As shown, the apparatus 432 includes several openings, such as an opening 434a and an opening 434b, representative of several additional openings. While prior examples of openings for an apparatus include through holes in which each openings passes completely through the apparatus (e.g., openings 334a and 334b of the apparatus 332, shown in FIG. 3), the base 456 covers a bottom portion, or lower portion, of the openings. Accordingly, the base 456 may provide a receiving surface for battery cells (not shown in FIG. 9) positioned in the openings of the apparatus 432.

FIG. 10 illustrates a cross sectional view of an apparatus 532 having a base 556 and a cover 558 for battery cells, in accordance with one or more implementations of the present disclosure. As shown, the apparatus 532 includes several openings, with a battery cell in each of the openings. For example, a battery cell 550*a* and a battery cell 550*b*, representative of several additional battery cells, located in respective openings (shown, not labeled) of the apparatus 532. The base 556 and the cover 558 may provide a bottom portion, or lower portion, and a top, or upper portion, respectively, of the openings of the apparatus 532 as well as the battery cells positioned in the openings. In order to electrically couple the battery cells together, a current collector 560 (positioned between the cover 558 and the battery cells) may electrically couple to the battery cells.

Figure 11:
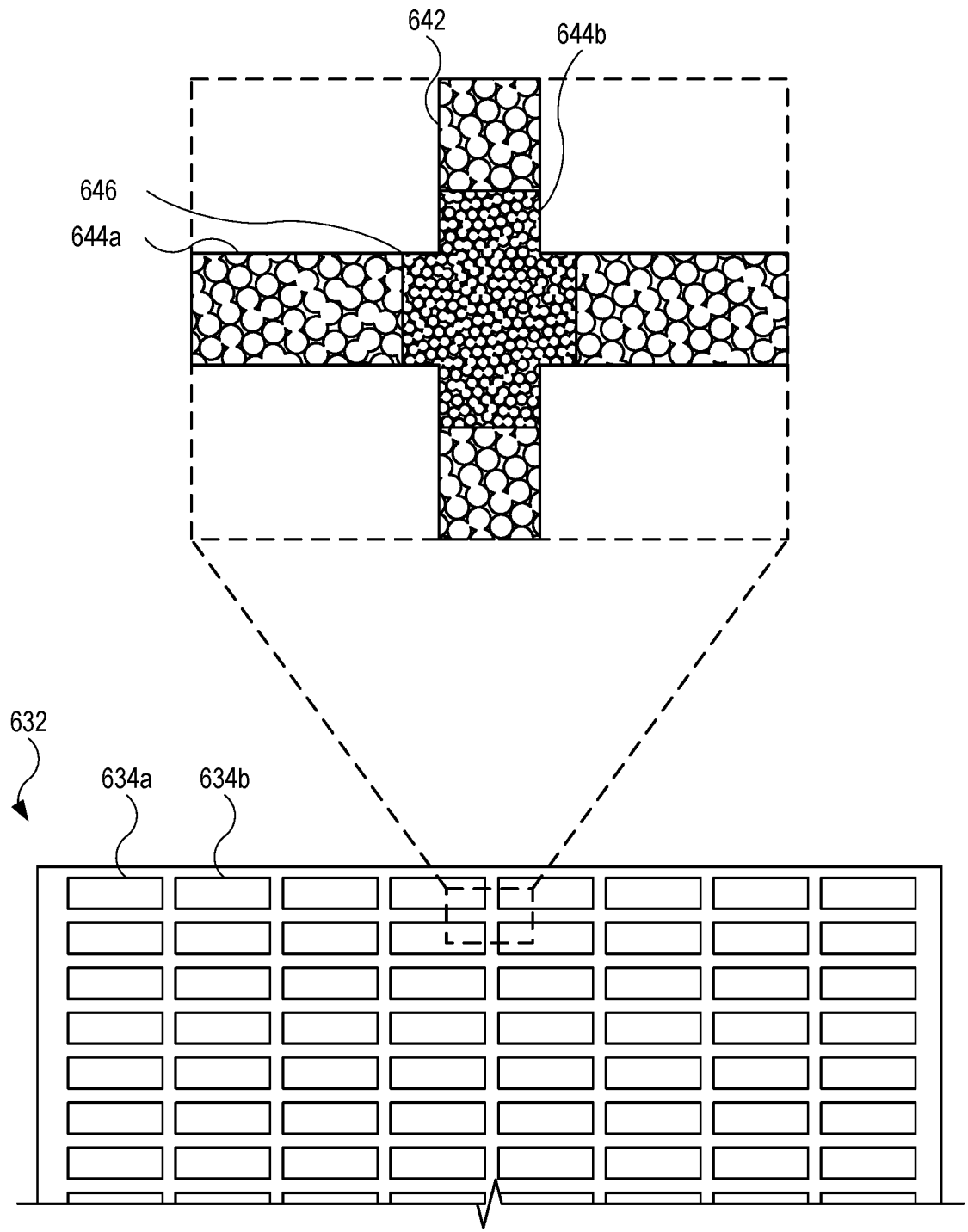
FIG. 11 illustrates an aerial view of an alternate example of an apparatus for other types of battery cells, in accordance with one or more implementations of the present disclosure.

FIG. 11 illustrates an aerial view of an alternate example of an apparatus 632 for other types of battery cells, in accordance with one or more implementations of the present disclosure. For example, the apparatus 632 may be designed for prismatic battery cells (shown in FIG. 2E) or pouch battery cells (shown in FIG. 2F). In this regard, the apparatus 632 may include rectangular openings. For example, the apparatus 632 may include an opening 634*a* and an opening 634*b*, representative of several additional openings of the apparatus 632. Each of the openings 634*a* and 634*b* may take the form of a rectangular opening.

Similar to prior examples for an apparatus, the apparatus 632 may include several pillars and several walls. For example, as shown in the enlarged view, the apparatus 632 includes a pillar 642, representative of several additional pillars. Also, the apparatus 632 may include a wall 644*a* and a wall 644*b*, representative of several additional walls. The pillar 642 and each of the walls 644*a* and 644*b* may be formed from several beads (shown, not labeled). Moreover, each of the beads used to form the pillar 642 may include the properties for the bead 336*a* (shown in FIG. 4A), and each of the beads used to form the walls 644*a* and 644*b* may include the properties for the bead 336*b* (shown in FIG. 4A). Accordingly, the pillar 642*a* may include beads with a dimension relatively smaller than that of the beads used to form the walls 644*a* and 644*b*. Also, the pillar 642 may include beads with a density in a relatively higher density range, while the walls 644*a* and 644*b* may include beads with a density in a relatively lower density range.

Additionally, the beads used to form the pillar 642*a* as well as the beads used to form the walls 644*a* and 644*b* may include the same chemistry. As a result, the beads used to form the pillar 642 may fuse together (similar to the beads 340*a*, 340*b*, and 340*c* shown in FIG. 4B). Similarly, the beads used to form the wall 644*a* may fuse together, and the beads used to form the wall 644*b* may fuse together. Moreover, based on using beads of the same chemistry, the beads at a boundary between a pillar and a wall may also fuse together. For example, the beads at a boundary 646 between the pillar 642 and the wall 644*a* may fuse together. Thus, the apparatus 632 may not require elements, such as adhesives or fasteners, to maintain the structural components (e.g., pillars and walls) together. Also, in one or more implementations, the beads used to form the pillars 642 may be substituted for a polymer. The polymer may include a density in a range similar to that of the bead 336*a* (shown in FIG. 4A).

Figure 12:
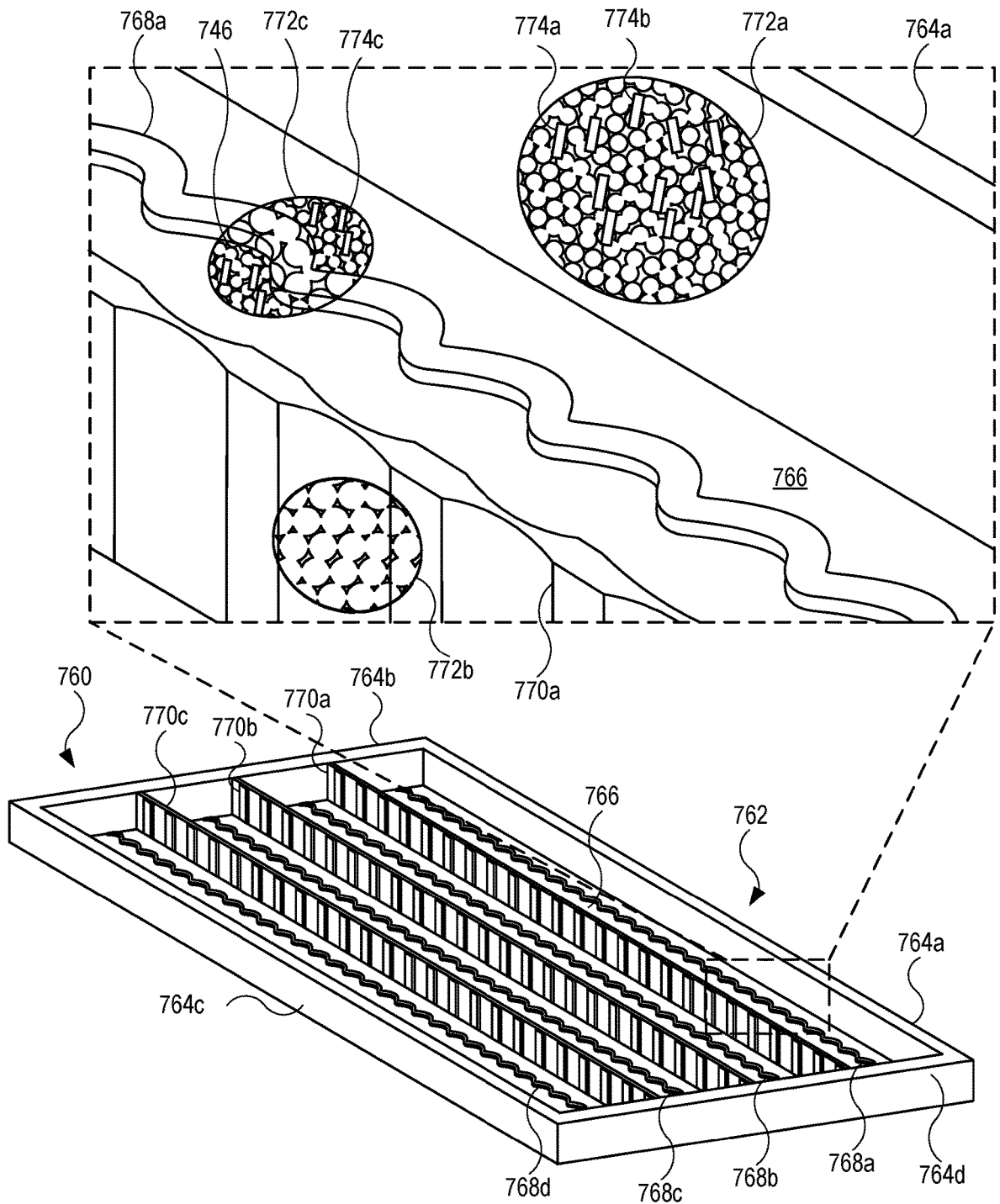
FIG. 12 illustrates a perspective view of an alternate example of an apparatus, in accordance with one or more implementations of the present disclosure.

FIG. 12 illustrates a perspective view of an alternate example of an apparatus 760, in accordance with one or more implementations of the present disclosure. The apparatus 760 may take the form of a battery subassembly. In this regard, the apparatus 760 may be used as a battery module, a battery carrier, or a battery packing enclosure, as non-limiting examples. As shown, the apparatus 760 may include a panel 762 with several walls. For example, the panel 762 may include a wall 764*a*, a wall 764*b*, a wall 764*c*, and a wall 764*d*. The walls 764*a*, 764*b*, 764*c*, and 764*d* may be referred to as outer walls or perimeter walls, as non-limiting examples. Additionally, the panel 762 may include a wall 766, which may be referred to as a bottom wall. Each of the walls 764*a*, 764*b*, 764*c*, and 764*d* may extend from the wall 766.

Additionally, the apparatus 760 may include several battery cell guides. For example, the apparatus may include a battery cell guide 768*a*, a battery cell guide 768*b*, a battery cell guide 768*c*, and a battery cell guide 768*d*. Each of the battery cell guides 768*a*, 768*b*, 768*c*, and 768*d* may extend from the wall 766. Additionally, the apparatus 760 may include a wall 770*a*, a wall 770*b*, and a wall 770*c*. The walls 770*a*, 770*b*, and 770*c* may be referred to as inner walls, with each of the walls 770*a*, 770*b*, and 770*c* extending from the wall 766. While a discrete number of battery cell guides (e.g., battery cell guides 768*a*, 768*b*, 768*c*, and 768*d*) and walls (e.g., walls 770*a*, 770*b*, and 770*c*) are shown, the number of battery cell guides and walls may vary. At least some of the aforementioned walls and/or battery cell guides may be relocated or removed. In this regard, the apparatus 760 may be designed to carry the battery cells 330 and the apparatus 332 (both shown in FIG. 3).

Similar to prior examples of apparatuses, the apparatus 760 may be formed from several beads. Also, similar to prior examples, the beads may be formed from PPE, m-PPE, polyurethane, polystyrene, or polypropylene, as non-limiting examples. As shown in the enlarged view, the walls and battery cell guides may be formed from several beads (shown, not labeled). A partial cross sectional view 772*a* shows the wall 764*a* (representative of the walls 764*b*, 764*c*, and 764*d* of the panel 762) being formed from beads. Additionally, a partial cross sectional view 772*b* shows the wall 770*a* (representative of the walls 770*b* and 770*c*) being formed from beads. Each of the beads used to form the wall 764*a* may include the properties for the bead 336*a* (shown in FIG. 4A), and each of the beads used to form the wall 770*a* may include the properties for the bead 336*b* (shown in FIG. 4A). Accordingly, the wall 764*a* may include beads with a dimension relatively smaller than that of the beads used to form the wall 770*a*. Also, the wall 764*a* may include beads with a density in a relatively higher density range, while the wall 770*a* may include beads with a density in a relatively lower density range.

Based on their respective properties, the wall 764*a* and the wall 764*a* may provide different functions for the apparatus 760. For example, the wall 764*a* may provide structural rigidity and mechanical support, based on having beads in a relatively high density range. Further, the wall 770*a* may provide elasticity and flexibility, based on having beads in a relatively low density range.

Additionally, the beads used to form the wall 764*a* as well as the beads used to form the wall 770*a* may include the same chemistry. As a result, the beads used to form the wall 764*a* may fuse together (similar to the beads 340*a*, 340*b*, and 340*c* shown in FIG. 4B). Similarly, the beads used to form the wall 770*a* may fuse together. Thus, the apparatus 760 may not require elements, such as adhesives or fasteners, to maintain the structural components (e.g., walls) together. Also, in one or more implementations, the beads used to form the wall 764*a* may be substituted for a polymer. The polymer may include a density in a range similar to that of the bead 336*a* (shown in FIG. 4A).

Further, a partial cross sectional view 772*c* shows the wall 766 being formed from beads, as well as the battery cell guide 768*a* (representative of the battery cell guides 768*b* and 768*c*) being formed from beads. Each of the beads used to form the wall 766 may include the properties for the bead 336a (shown in FIG. 4A), and each of the beads used to form the battery cell guide 768a may include the properties for the bead 336b (shown in FIG. 4A). Accordingly, the wall 766 may include beads with a dimension relatively smaller than that of the beads used to form the battery cell guide 768a. Also, the wall 766 may include beads with a density in a relatively higher density range, while the battery cell guide 768a may include beads with a density in a relatively lower density range. In this regard, the wall 766 may provide structural rigidity and mechanical support (based on having beads in a relatively high density range), while the battery cell guide 768a may provide elasticity and flexibility, based on having beads in a relatively low density range. Further, the beads used to form the wall 766a and the battery cell guide 768a may include the same chemistry, and accordingly, may fuse together. For example, the beads at a boundary 746 between the wall 766 and the battery cell guide 768a may fuse together.

In order to provide additional support, the apparatus 760 may include several fibers. For example, the partial cross sectional view 772a shows the a fiber 774a and a fiber 774b, representative of several additional fibers, interspersed with the beads. Further, the partial cross sectional view 772c shows a fiber 774c, representative of several additional fibers, interspersed with the beads. As non-limiting examples, the fibers 774a, 774b, and 774c may include glass fibers, carbon fibers, or a combination thereof. Further, the fibers may be interspersed with the beads in the relatively high density range, thus providing the structures formed from the high density beads with additional mechanical support.

Figure 13:
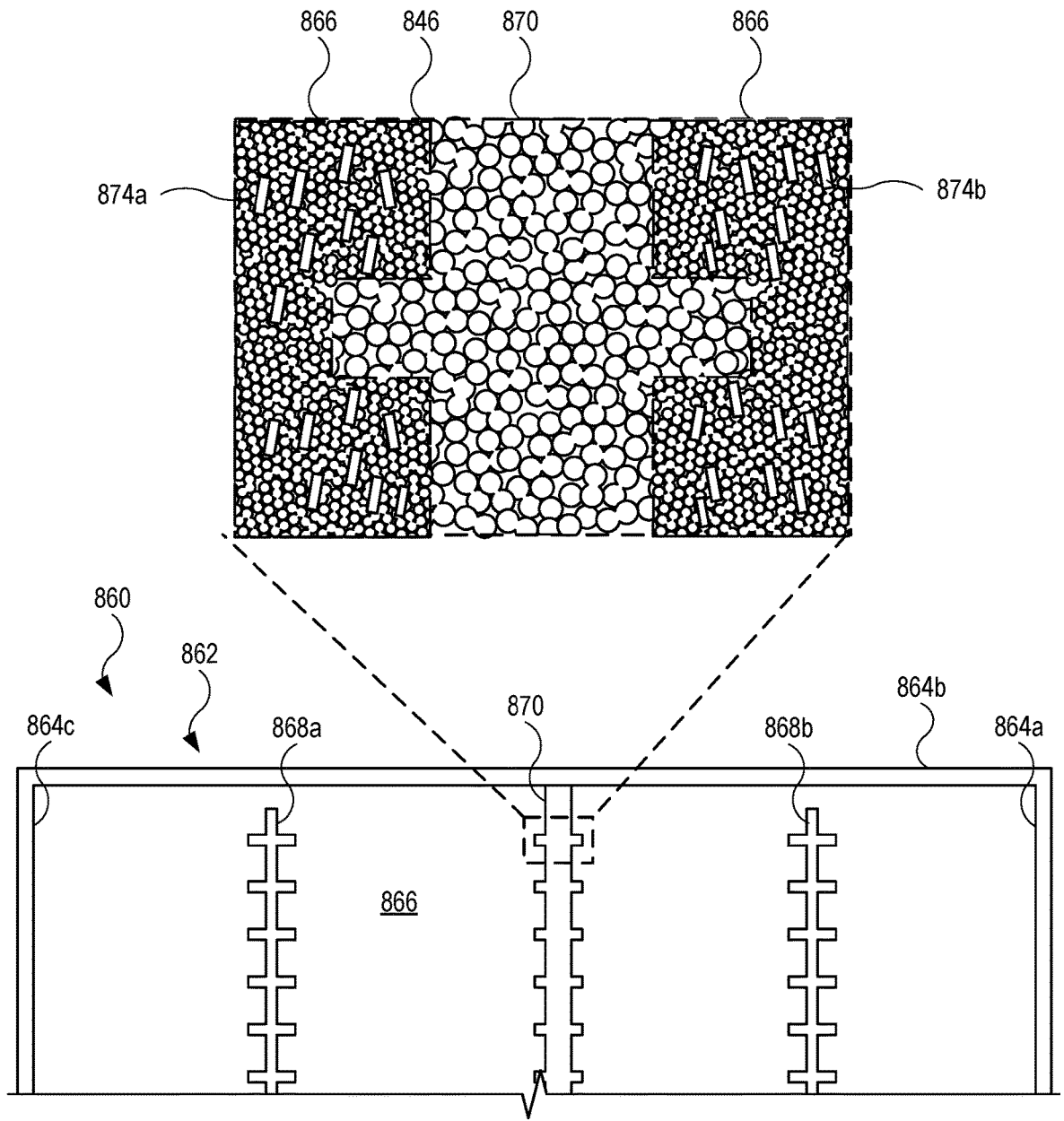
FIG. 13 illustrates a perspective view of an alternate example of an apparatus, in accordance with one or more implementations of the present disclosure.

FIG. 13 illustrates an aerial view of an alternate example of an apparatus 860 for other types of battery cells, in accordance with one or more implementations of the present disclosure. The apparatus 860 may include an alternate battery pack enclosure. As shown, the apparatus 860 includes a panel 862 that includes a wall 864a, a wall 864b, and a wall 864c, each of which may be referred to as a perimeter wall or an outer wall. One or more additional walls may be present. The panel 862 may further include a wall 866, which may be referred to as a bottom wall. In this regard, the apparatus 860 may be designed for prismatic battery cells (shown in FIG. 2E) or pouch battery cells (shown in FIG. 2F). In this regard, the apparatus 860 may include a battery cell guide 868a and a battery cell guide 868b, as well as a wall 870 positioned between the battery cell guides 868a and 868b. As shown, the battery cell guides 868a and 868b may combine with the wall 870 to form rectangular, or at least partially rectangular, slots, thus allowing the apparatus 860 to receive rectangular battery cells, such as prismatic or pouch battery cells.

Similar to prior examples for an apparatus, the apparatus 860 may be formed from several beads. For example, as shown in the enlarged view, each of the wall 866 and the wall 870 may be formed from several beads (shown, not labeled). Moreover, each of the beads used to form the wall 866 may include the properties for the bead 336a (shown in FIG. 4A), and each of the beads used to form the wall 870 may include the properties for the bead 336b (shown in FIG. 4A). Accordingly, the wall 866 may include beads with a dimension relatively smaller than that of the beads used to form the wall 870. Also, the wall 866 may include beads with a density in a relatively higher density range, while the wall 870 may include beads with a density in a relatively lower density range. Although not expressly shown, the battery cell guides 868a and 868b may be formed from beads with the same characteristics as those of the wall 870, and accordingly, the battery cell guides 868a and 868b may include the properties for the bead 336b (shown in FIG. 4A).

Additionally, the beads used to form the wall 866 as well as the beads used to form the wall 870 may include the same chemistry. As a result, the beads used to form the wall 866 may fuse together (similar to the beads 340a, 340b, and 340c shown in FIG. 4B). Similarly, the beads used to form the wall 870 may fuse together. Moreover, based on the use of the same chemistry of beads, the beads at a boundary between the wall 866 and the wall 870 may also fuse together. For example, the beads at a boundary 846 between the wall 866 and the wall 870 may fuse together. While an aerial view is shown, the wall 870 may be elevated with respect to the wall 866. In this regard, the boundary 846 may be at a base of the wall 870 (e.g., where the wall 870 engages the wall 866). Thus, the apparatus 860 may not require elements, such as adhesives or fasteners, to maintain the structural components (e.g., pillars and walls) together. Also, in one or more implementations, the beads used to form the wall 866 may be substituted for a polymer. The polymer may include a density in a range similar to that of the bead 336a (shown in FIG. 4A).

Additionally, the wall 866 may include several fibers. For example, the wall 866 may include a fiber 874a and a fiber 874b, representative of several additional fibers, interspersed with the beads. As non-limiting examples, the fibers 874a and 874b may include glass fibers, carbon fibers, or a combination thereof. Further, the fibers may be interspersed with the beads in the relatively high density range, thus providing the structures formed from the high density beads with additional mechanical support.

Figure 14:
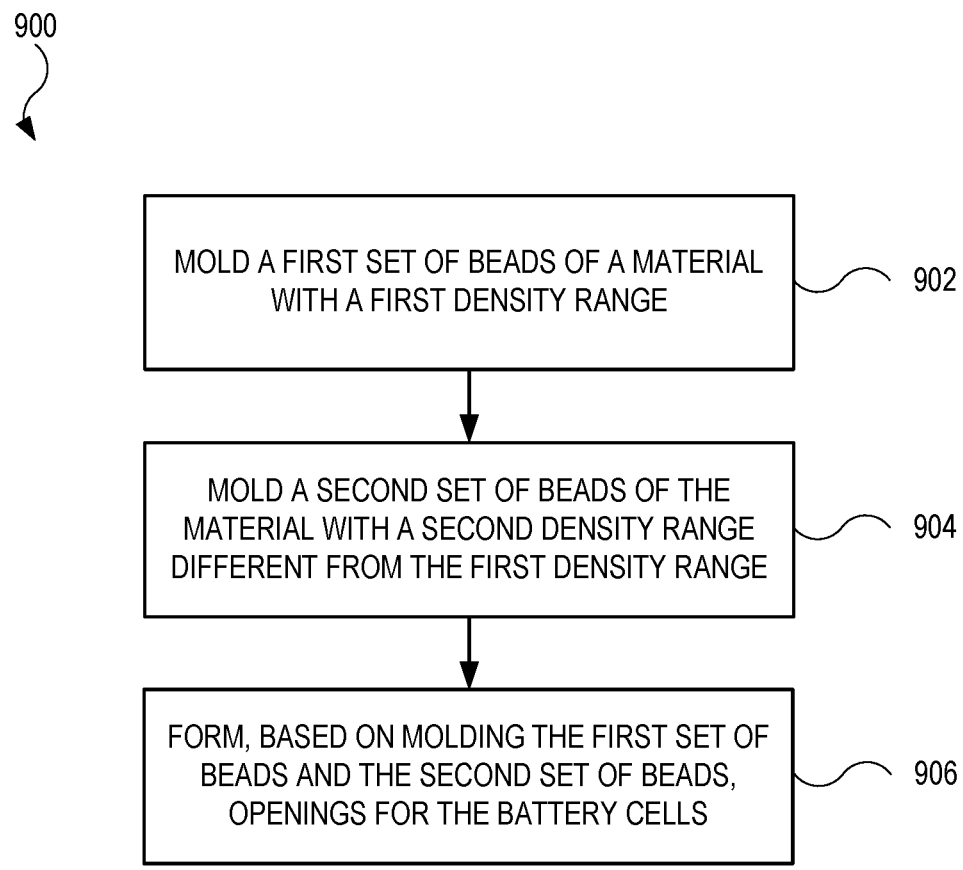
FIG. 14 illustrates a flow diagram showing an example of a process that may be performed for potting battery cells, in accordance with implementations of the subject technology.

FIG. 14 illustrates a flow diagram of an example of a process 900 that may be performed for potting battery cells, in accordance with implementations of the subject technology. For explanatory purposes, the process 900 is primarily described herein with reference to the apparatus 332 shown in FIG. 3. However, the process 900 is not limited to the apparatus 332 shown in FIG. 3, and one or more blocks (or operations) of the process 900 may be performed by one or more other structural components of other suitable moveable apparatuses, devices, or systems. For example, the process 900 may be applicable to the apparatus 760 shown in FIG. 12. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

At step 902, a first set of beads of a material with a first density range is molded. In one or more implementations, the first set of beads forms one or more pillars of a potting structure. Based on beads at or within the first density range, the one or more pillars may provide mechanical support for the potting structure.

At step 904, molding a second set of beads of the material with a second density range different from the first density range is molded. In one or more implementations, the second set of beads forms one or more walls for the potting structure, with the one or more walls connecting with at least some of the one or more pillars.

Based on beads at or within the second density range, the one or more walls may provide elasticity and flexibility for the potting structure, as well as mitigation of vibration. Also, beads within the first density range may be smaller than the beads within the second density range. However, beads within the first density range may denser than the beads within the second density range. Also, the beads may be formed from PPE, m-PPE, polyurethane, polystyrene, or polypropylene, as non-limiting examples.

At step 906, based on molding the first set of beads and the second set of beads, openings for the battery cells are formed. Each opening of the openings may be designed to receive a battery cell. Further, in one or more implementations, the battery cells are positioned in respective openings based on a press fit, and accordingly, the battery cells are retained by frictional forces.

Aspects of the subject technology can help reduce the weight of a vehicle. When the vehicle is an electric vehicle, the range (e.g., distance traveled when the battery/batteries of the vehicle are charged) may increase based in part on the reduced weight. This can help facilitate the functioning of and/or proliferation of electric vehicles, which can positively impact the climate by reducing greenhouse gas emissions.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
   a single material comprising:
      a first portion comprising a density in a first density range; and
      a second portion comprising a density in a second density range different from the first density range, wherein the first portion and the second portion define openings for battery cells, wherein:
      the first portion is formed from a first set of beads of the first density range, and
      the second portion is formed from a second set of beads of the second density range.

2. The apparatus of claim 1, wherein:
   a bead from the first set of beads comprises a first dimension, and
   a bead from the first set of beads comprises a second dimension greater than the first dimension.

3. The apparatus of claim 2, wherein the first density range is greater than the second density range.

4. The apparatus of claim 1, wherein:
   the openings comprise a first opening, a second opening, and a third opening,
   the first portion forms a pillar between the first opening, the second opening, and the third opening,
   the second portion forms a wall between the first opening and the second opening, and
   the wall is connected to the pillar.

5. The apparatus of claim 1, wherein the single material is selected from a group consisting of polyphenylene ether (PPE), modified polyphenylene ether (m-PPE), polyurethane, polystyrene, or polypropylene.

6. The apparatus of claim 1, wherein the openings comprise circular openings or rectangular openings.

7. The apparatus of claim 1, wherein at a boundary between the first portion and the second portion:
the first portion comprises a first bead;
the second portion comprises a second bead; and
based on a chemistry of the single material being the same in the first portion and in the second portion, the second bead is fused with the first bead.

8. The apparatus of claim 1, wherein the openings comprise a circular opening having a diameter less than a battery cell diameter of a battery cell of the battery cells.

9. The apparatus of claim 1, wherein:
the first portion comprises a panel comprising a plurality of walls, the plurality of walls formed from the first set of beads; and
the second portion comprises one or more battery cell guides that extend from the panel, the one or more battery cell guides comprising a density in a second density range different from the first density range formed from the second set of beads.

10. The apparatus of claim 9, wherein:
the panel further comprises fibers, and
the fibers are selected from a group that includes glass fibers, carbon fibers, or a combination thereof.

11. The apparatus of claim 9, wherein:
wherein the first set of beads is separate from the second set of beads.

12. The apparatus of claim 11, wherein the single material comprises a closed cell foam formed from the first set of beads and the second set of beads.

13. The apparatus of claim 11, wherein based on the single material:
at least some of the first set of beads are fused together, and at least some of the second set of beads are fused together.

14. The apparatus of claim 9, wherein the panel carries a battery pack within a vehicle.

15. The apparatus of claim 9, wherein the first density range is greater than the second density range.

16. The apparatus of claim 9, wherein:
the plurality of walls comprise:
a bottom wall; and
one or more outer walls that define a perimeter of the panel; and
the one or more battery cell guides and the one or more outer walls extend from the bottom wall.

17. The apparatus of claim 1, wherein:
the first density range is defined by a first density and a second density,
and
the first density is less than 1.0 grams per cubic centimeter (g/cm$^3$), and
the second density is greater than 1.0 g/cm$^3$.

18. The apparatus of claim 1, wherein a chemistry of the single material in the first portion and in the second portion are the same.

* * * * *

UNITED STATES PATENT AND TRADEMARK OFFICE
CERTIFICATE OF CORRECTION

| | | |
|---|---|---|
| PATENT NO. | : 12,126,041 B1 | Page 1 of 1 |
| APPLICATION NO. | : 18/360732 | |
| DATED | : October 22, 2024 | |
| INVENTOR(S) | : Yichi Zhang et al. | |

It is certified that error appears in the above-identified patent and that said Letters Patent is hereby corrected as shown below:

In the Claims

Column 23; Line 25 (Claim 9): Replace "guides comprising a" with --guides having a--.

Signed and Sealed this
Fourth Day of February, 2025

Coke Morgan Stewart
*Acting Director of the United States Patent and Trademark Office*